(12) United States Patent
Stöhr et al.

(10) Patent No.: US 12,516,825 B2
(45) Date of Patent: Jan. 6, 2026

(54) APPLIANCE, IN PARTICULAR COOKING APPLIANCE

(71) Applicant: ELECTROLUX APPLIANCES AKTIEBOLAG, Stockholm (SE)

(72) Inventors: Dominik Stöhr, Rothenburg ob der Tauber (DE); Stephan Haag, Rothenburg ob der Tauber (DE); Branko Ivanovic, Rothenburg ob der Tauber (DE); Andreas Stark, Rothenburg ob der Tauber (DE); Tim Breuer, Rothenburg ob der Tauber (DE); Eren Güzelceada, Rothenburg ob der Tauber (DE); Magdalena Moll, Rothenburg ob der Tauber (DE); Marco Böckler, Rothenburg ob der Tauber (DE)

(73) Assignee: Electrolux Appliances Aktiebolag, Stockholm (SE)

( * ) Notice: Subject to any disclaimer, the term of this patent is extended or adjusted under 35 U.S.C. 154(b) by 395 days.

(21) Appl. No.: 18/023,837

(22) PCT Filed: Aug. 3, 2021

(86) PCT No.: PCT/EP2021/071607
§ 371 (c)(1),
(2) Date: Feb. 28, 2023

(87) PCT Pub. No.: WO2022/053225
PCT Pub. Date: Mar. 17, 2022

(65) Prior Publication Data
US 2023/0243516 A1    Aug. 3, 2023

(30) Foreign Application Priority Data

Sep. 10, 2020  (EP) .................................... 20195475

(51) Int. Cl.
F24C 15/16      (2006.01)
E05F 15/71      (2015.01)
E05F 15/75      (2015.01)

(52) U.S. Cl.
CPC ............ *F24C 15/162* (2013.01); *E05F 15/71* (2015.01); *E05F 15/75* (2015.01); *F24C 15/168* (2013.01); *E05Y 2900/308* (2013.01)

(58) Field of Classification Search
CPC ...... F24C 15/162; F24C 15/168; E05F 15/75; E05F 15/71; A47B 96/16; E05Y 2900/308
See application file for complete search history.

(56) References Cited

U.S. PATENT DOCUMENTS 1,740,505 A   12/1929   Groak
1,793,955 A   2/1931    Otte
(Continued)

FOREIGN PATENT DOCUMENTS

CH           235801        12/1944
DE        102015115573     3/2017
(Continued)

OTHER PUBLICATIONS

International Search Report and Written Opinion for PCT/EP2021/071607, dated Jan. 4, 2022, 22 pages.

*Primary Examiner* — Alfred Basichas
(74) *Attorney, Agent, or Firm* — Chrisman Gallo Tochtrop LLC

(57) ABSTRACT

The underlying invention is directed to an appliance (1), in particular a cooking appliance, such as a baking oven (1). The appliance (1) comprises a cavity (2) comprising a back wall (3) and an opposite front opening (4), the cavity (2) defining in depth dimension (D) a maximum depth dimension ($D_{max}$) for the accommodation of carriers (5), such as trays (5) or grids, a rack (7) comprising at least one carrier (Continued)

support (8, 17, 34), the rack (7) movably associated with the cavity interior (9) and having a depth extension (E) that is smaller than the maximum depth dimension ($D_{max}$), a door (10) for opening and closing the front opening (4) and hinged to open to the outside, and a coupling member (11) providing a kinematic coupling between the rack (7) and the door (10) configured such that a pivoting movement of the door (10) is translated into a movement of the rack (7) in depth dimension (D).

20 Claims, 6 Drawing Sheets

(56) References Cited

U.S. PATENT DOCUMENTS

| | | | |
|---|---|---|---|
| 1,987,087 | A | 1/1935 | Underwood |
| 2,296,950 | A * | 9/1942 | Roedl .................. F24C 15/162 126/340 |
| 2,978,363 | A | 4/1961 | Loebich et al. |
| 3,009,458 | A | 11/1961 | Pearce |
| 3,106,202 | A | 10/1963 | Arduna |

FOREIGN PATENT DOCUMENTS

| | | |
|---|---|---|
| EP | 0521251 | 1/1993 |
| JP | S6199034 | 5/1986 |
| KR | 20140121575 | 10/2014 |

\* cited by examiner

APPLIANCE, IN PARTICULAR COOKING APPLIANCE

The present invention relates to an appliance, in particular a cooking appliance, such as a baking oven.

Various types of household appliances comprise cavities with carriers, such as trays or grids that are movable into and out of the cavity and that are configured for accommodating objects such as food items, dishes, crockery, cutlery and the like.

Such household appliances, for example baking ovens, dishwashers etc., may comprise rack systems for accommodating and retaining the carriers within their cavities. Corresponding rack systems may be specifically adapted to allow a user to move the tray in and out of the cavity in an extraction and retraction movement. It is also known that such appliances may comprise rack systems that are movable within the cavity to make it easier for the user to extract and retract the carrier relative to the cavity interior.

U.S. Pat. No. 3,106,202 for example describes an oven with a cavity and a rack system. The rack system is associated with the interior of the cavity and comprises several carriers in the form of wire grids. A lever arm is coupled to the door and to the carriers and is arranged to extract and retract the carriers upon opening and closing the door.

EP 0 521 251 A1 describes a baking oven comprising a drawer with a rack adapted to support carriers. The drawer simplifies extracting and retracting the carriers relative to the cavity interior.

Albeit there exist some solutions assisting a user in extracting and retracting the carriers relative to the cavity interior of a household appliance, there is still room for further improvement, in particular with regard to further assisting the user in extracting and retracting the carriers.

Therefore, it is an object of the present invention to provide an appliance, in particular a cooking appliance, such as a baking oven, that provides improved assistance for users with regard to operating the appliance. In particular, it is an object of the invention to provide an appliance that provides improved assistance in connection with handling carriers associated with the appliance, in particular in connection with extracting and retracting the carriers relative to the cavity interior.

According to an example embodiment, an appliance, in particular ra household appliance, is provided that comprises a cavity, a rack, a door, and at least one coupling member, for example two or more than two coupling members. The mentioned components of the appliance will be described in connection with embodiments in further detail below.

The appliance, in particular electric appliance, may be a household appliance, a kitchen appliance, a cooking appliance, such as for example a baking oven, a refrigerator, or a dishwasher or similar.

The cavity of the appliance comprises a back wall and an opposite front opening. In connection with the cavity, further reference may be made to two lateral side walls extending between the back wall and front opening, and to a bottom wall and a top wall. The identified walls and the front opening define the cavity interior in the ordinary operating position of the appliance. The terms back, front, top, bottom, and lateral shall refer to the position and orientation of the appliance in the ordinary use condition and intended operating position and situation.

The cavity is configured for accommodating therein one or more carriers, in particular object carriers, such as trays or grids, through the front opening. Or to put it in other words, the front opening is arranged to enable carriers being removed from and inserted into the cavity via the front opening in an extraction and retraction movement. A carrier in this connection in particular refers to a carrier element having a two-dimensional extension, such as for example a substantially planar area or surface, for accommodating and carrying objects, such as food items, dishes, cutlery, and other items to be positioned within the cavity of the appliance, in particular in its intended use.

The cavity interior of the appliance defines in a depth dimension from the front opening to the back wall a maximum depth dimension for the accommodation of carriers. As mentioned, the "depth dimension" relates to the dimension of the cavity from the front opening to the back wall, i.e. from front to back.

In connection with appliances having vertical back walls and front openings with regard to the ordinary orientation of use, the depth dimension may relate to the horizontal extension of the cavity from front to back.

The maximum depth dimension for the accommodation of carriers shall in particular relate to and define the maximum size or dimension of carriers that can reasonably and under ordinary operating conditions be put into the cavity with regard to the extension from front to back. For example, the exact dimension of the cavity in depth dimension is ordinarily slightly larger than the maximum size of carriers that can be used in ordinary operation such that a smooth insertion and placement of the carriers within the cavity is possible, without impeding proper closure of the door and without causing damages to the inner cavity walls upon closing the door.

As mentioned, the appliance comprises a rack. The rack comprises at least one support for supporting, within the cavity, at least one carrier, such as a tray or grid. Preferably, the rack comprises two or more supports for supporting carriers at different height levels within the cavity. According to the ordinary use condition, the height levels may refer to different levels in vertical direction.

The rack may for example be implemented as or comprise a wire grid assembly with one or more vertical bars and one or more horizontal bars supporting the vertical bars. The vertical bars are configured for accommodating and supporting the carriers, for example at lateral edges of thereof.

Other implementations of a rack are possible, such sheets and plates, for example made at least in part from one of metal, glass, and one or more suitable plastic materials. In such embodiments, the supports may be implemented as grooves and/or strips obtained for example by bending, folding, forming, welding, additive manufacturing and/or machining such as milling and the like.

The rack may comprise one or more support structures, in particular support frames. A support structure or support frame may be configured for being placed along, in particular parallel to, one of the lateral side walls extending between the back wall and the front opening.

In embodiments, the rack may comprise two support structures or support frames configured for placement along and in parallel to the opposite lateral side walls extending between the back wall and the front opening of the cavity. In such embodiments, the rack may be configured such that in the ordinary position within the cavity, each support structure or support frame is placed along one of the two opposite lateral side walls. Preferably, such support structures or support frames, or in general the rack, may comprise one or more, in particular several, support levels for placing carriers at different levels, i.e. support levels, in vertical direction, in particular height levels, within the cavity. Support structures of this kind may be configured for engaging the edges of a carrier, running, when positioned in the cavity, in horizontal direction and parallel to the lateral side walls of the cavity.

In embodiments, the rack may comprise a support structure that is arranged parallel to the back wall and configured for engaging carriers, such as trays or grids, at a rear side or rear edge thereof with regard to the carrier positioned in the cavity.

If the rack comprises for example several, i.e. two or more, support structures or support frames, they may be interconnected, for example at a lower side thereof, at an upper side thereof, and/or at a front or back side thereof, wherein the terms lower, upper, back, and front relate to the ordinary condition of use of the appliance, in which the front opening and/or a door closing the front opening is associated with the front side of the appliance.

Based on an interconnection of two or more support structures or support frames, the support structures or support frames may be kinematically linked or coupled such that they can be handled, in particular moved or displaced, together, in particular in a synchronized manner. Further, such interconnections provide mechanical stabilization with regard to the placement and position relative to the inner side of the walls of the cavity.

In embodiments, a rack may comprise a single support structure or a single support frame. The single support structure or frame may be configured and arranged for placement parallel to the back wall of the cavity or parallel to a lateral side wall extending between the back wall and the front opening of the cavity. In such embodiments, supports, i.e. the carrier supports, and corresponding carrier holders or carrier mounts may be configured for supporting or holding a carrier at a back side thereof, i.e. rear side, facing the back wall of the cavity, or at a lateral side thereof facing one of the two lateral walls of the cavity with regard to the ordinary placement of the carrier within the cavity. In other embodiments, the appliance comprises two support structures or two support frames, arranged symmetrically within the cavity, for example at or along the lateral side walls extending between the back wall and the front opening of the cavity.

According to an example embodiment, the rack is movably associated with the cavity interior and has a depth extension, measured parallel to depth dimension of the cavity that is smaller than the maximum depth dimension.

Preferably, the depth extension of the rack is substantially smaller than the maximum depth dimension. Substantially smaller in particular may relate to racks that have an extension in depth dimension of the cavity, i.e. a depth extension, amounting to 10% to 50%, preferably to 20% to 30% of the maximum depth dimension. The depth dimension in particular may refer to the dimension of the cavity measured in horizontal direction parallel to extraction and retraction movements of a carrier enabled and defined by the carrier supports and/or rack.

In an example embodiment, the door is provided and configured for opening and closing the front opening. Further, the door is hinged, in particular pivoted, to open to the outside. The expression "to open to the outside" in particular shall mean that opening the door is associated with a movement of sections of the door away from the cavity. To put it differently, the door is hinged such that the door as such does not interfere with the cavity interior in the opened position of the door.

The door may be hinged, for example to a frame, frame sections and/or to a front panel of the appliance, by means of a horizontal hinge axis or pivot axis, and/or by means of a vertical hinge axis or pivot axis, wherein the "and/or" shall mean that the door may be attached with a suitable mechanism enabling either a movement around a horizontal pivot axis or a movement around a vertical pivot axis based on different settings of the mechanism, for example selectable or settable by the user and/or via a corresponding mechanism of the appliance.

The appliance according to an example embodiment further comprises at least one coupling member.

The coupling member may be substantially rigid, i.e. a substantially rigid coupling member, wherein the term "substantially rigid" shall mean that the coupling member is basically stable against bendings out of shape and deflections perpendicular to the lengthwise extension of the coupling member under ordinary use conditions. The term "rigid" in this connection in particular shall mean that the coupling member as such is stable with regard to mediating movements between the door and the rack. Ordinary and slight bending out of shape that may occur in connection with mediating movements between the door and the rack, for example in case that the rack supports a heavily loaded carrier, shall be considered as being covered by the term "substantially rigid". For example, forces occurring during joint movements of the door and rack mediated by a substantially rigid coupling member may cause slight bending of the coupling member, for example depending on the particular implementation and design of the coupling member. As mentioned, slight bendings out of shape and minor deflections shall be considered as being covered by the term "substantially rigid", in particular because a slight bending out of shape as such is not associated with and a characteristic and requirement for the coupling member to jointly move the door and rack based on the kinematic coupling mediated by the coupling member. In this regard, a rigid coupling member in such embodiments may be considered as being substantially transversely stable or rigid, i.e. as a substantially transversely rigid coupling member.

However, the term "rigid" shall not exclude variations in the lengthwise extension, if for example one or more damping elements are provided for damping dynamic loads acting on the coupling member in lengthwise direction. Embodiments of the coupling member may provide such damping elements. Further, damping elements may be provided in connection with other components suitable for damping dynamic loads occurring in connection with movements of the rack, the carrier, and/or the door during extraction and retraction movements of the rack and/or carrier, and/or opening and closing movements of the door. Such damping elements may for example be provided in connection with or be part of pivot mounts of the coupling member, wherein the pivot mounts as such will be described in more detail below.

The coupling member may be implemented as an elongate coupling element, such as a bar, rod, or a bar-like or rod-like element or comprise one or more of such components. As such, the coupling member may be, with regard to shape, an elongate coupling member. For example, the coupling member may comprise one or more, e.g. two, bars or rods extending in lengthwise direction of the coupling member. The bars or rods may be interconnected for example by one or more cross bars, rods or similar elements for stabilising the coupling member against transversal bending or deformation.

The coupling member provides, in particular establishes, a kinematic coupling between the rack and the door. In other words, the rack and the door are kinematically coupled by means of the coupling member.

The coupling member comprises at least two pivot mounts, in particular exactly two, or two or more pivot mounts. The pivot mounts may be provided at fixed positions spaced from each other in lengthwise direction of the coupling member. The pivot mounts may for example be provided and implemented at sections spaced in lengthwise direction of the coupling member, in particular at or in the region of the lengthwise opposed ends of the coupling member, in particular an elongate coupling member. In particular, the pivot mounts may be located at or in the region of the outer ends of the coupling member with regard to the lengthwise extension of the coupling member. However, the pivot mounts, in particular at least one of them, may be located at a predefined distance from an outer end.

In embodiments, the pivot mounts, in particular at least one of them, may be relocatably arranged or positioned with regard to the lengthwise extension of the coupling member. For example, the pivot mount may be movably, in particular slidably, coupled to the coupling member, e.g. a rod or bar thereof, such that it can be positioned at different locations. A locking mechanism may be provided for locking the pivot mount at the different locations. By providing such a moveable pivot mounts, the kinematic movements mediated by the kinematic coupling between the door and rack may be adapted by relocating the pivot mount.

The pivot mounts are pivoted at the track and door, respectively. The pivot mounts may comprise pivot mounting sections adapted for being pivotally coupled to complementary pivot mounts at the door and rack, respectively.

In embodiments, one of the pivot mounts may be pivoted, in particular hinged or articulated, at the rack, and the another one of the pivot mounts may be pivoted, in particular hinged or articulated, at the door. In particular embodiments, the pivot mounts may be directly pivoted, in particular hinged or articulated, to the rack and/or door, for example by means of corresponding complementary pivot mounts of the door and rack.

The coupling member is pivoted and provides the kinematic coupling between the rack and door such that a pivoting opening and closing movement of the door is translated into an extraction and retraction movement of the rack in depth dimension by the action of the coupling member via the pivot mounts. As such, a pivoting opening or closing movement of the door may be translated into a forth and back movement of the rack, i.e. a movement away from the back wall and a movement towards the back wall of the cavity. The movement away from the back wall may be associated with an extraction or outward movement, and the movement towards the back wall may be associated with a retraction or inward movement.

The movement of the rack is preferably a linear movement parallel to the depth dimension, for example in substantially horizontal direction.

According to an example embodiment, the kinematic coupling provided by the coupling member and the depth extension of the rack are configured such that the rack is fully positioned within the cavity in the door closed position, and that the rack at most partially projects out of the opening in the door fully opened position. This configuration in particular provides the advantage of assisting the user in extracting and retracting, e.g. in removing and inputting, carriers, such as trays or grids, into eh cavity. Further, configuring the kinematic coupling and depth dimensions such that the rack at most partially projects out of the opening has the advantage of avoiding interferences between user activities in the region of the front opening in the opened position of the door. This may for example be of advantage in connection with baking ovens, because the racks may be hot after a baking process, and leaving the rack for example within or at least to a major amount within the cavity may avoid burn injuries.

The expression "at most partially projects out of the front opening" shall mean, that the rack remains within the cavity or that at most a part, in particular a frontal part or section, of the rack projects out of the cavity in the opened position of the door. The frontal part or section of the rack shall mean a part or section of the rack when viewed in a plan view of the front opening. Or, to put it differently, the frontal part or section shall mean a part or section of the rack that is oriented towards the front opening and door in the closed position of the door.

In embodiments, the kinematic coupling, and in particular the depth extension of the rack, may be configured and arranged such that the rack completely remains within the cavity also in the fully opened position of the door. Remaining within the cavity may for example involve that the frontal part or section, in particular the frontal side or frontal edge, of the rack, e.g. the side or edge averted from the back wall of the cavity, remains behind, lies within, or reaches the opening area of the front opening in depth direction in the fully opened position of the door. The "fully opened position" shall refer to the opened position of the door, in which the door cannot be opened further under ordinary use conditions. Further, and based on the kinematic coupling mediated by the coupling member, the "fully opened position" corresponds to the foremost position of the rack as mediated by the kinematic coupling, i.e. the position farthest away from the back wall. The closed position of the door shall correspond to the rearmost position of the rack as mediated by the kinematic coupling, i.e. the position closest to the back wall.

In embodiments, the coupling member is coupled to a frontal section, side or edge, i.e. a front-end section, e.g. a frontal side or edge, of the rack. In line with the above discussion, the frontal section may be considered as lying at a side of the rack that directly faces the front opening, for example in a state in which the rack is positioned in the rearmost position within the cavity. The rack may comprise, in particular, at the frontal section, e.g. at a frontal side, at least one cantilevering element, for example a cantilever bar. The cantilevering element may have a free end with a complementary pivot mount for pivotally mounting one of the pivot mounts of the coupling member.

In embodiments, the cantilevering element may project at the frontal section, in particular the frontal side, of the rack one of parallel to or perpendicular to the depth dimension of the cavity.

In embodiments, the cantilevering element may have a triangular design, in particular a triangular shape. Such a triangular design may involve two legs extending between a frontal section, in particular frontal side or edge, of a, e.g. horizontal or vertical, bar of the rack and the complementary pivot mount. The cantilevering element, in particular the legs, may be configured and arranged such that the cantilevering element, in particular the legs, fix the complementary pivot mount at a predefined distance from a frontal attachment site of the cantilevering element, for example a predefined distance from a frontal section, in particular a frontal side or frontal edge for example a frontal bar, of the rack to which the cantilevering element is fixed or from which the cantilevering element extends.

By using one or more such cantilevering elements may be advantageous in connection adapting the kinematic coupling to geometric configurations and different ranges for moving the rack out of the cavity. Further, such cantilevering elements may ease the process of pivotally coupling, in particular mounting, the coupling member to the rack.

In embodiments, the appliance may comprise at least one damping element for damping movements of at least one of the rack, the door, and at least one of the one or more carriers, in particular if a carrier is placed on the rack. The damping element may in particular be configured for damping movements mediated by the coupling member between the rack, the door and/or at least one of the one or more carriers. The damping element may be associated with, i.e. coupled or mounted to, one of the coupling members, at least one of the pivot mounts, the rack, the door, a door hinge of the door, and/or the complementary pivot mount, and/or the cantilevering element. The damping element may be configured to directly interact with at least one of: the door, a door hinge, the coupling member, the rack, and at least one of the one or more carriers, i.e. in general with one or more components of the appliance involved in the movement associated with a joint movement of the door (including movements of one or more door hinges), the rack, and one or more carriers if placed on the rack. Such a damping element may for example be provided as a component of the coupling member and/or of the pivot mount and/or of the complementary pivot mount. Further, in embodiments, the damping element, one or more of the damping elements and/or further damping elements may be provided in connection with guiding unit configured for moveably supporting the rack for extraction and retraction movements. Such damping elements may for example be implemented as dampers located at end sections of the movement path defined by one or more guiding units provided for moveably supporting the rack in the cavity for extraction and retraction movements.

In embodiments, the movement of the rack in depth dimension, i.e. in extraction and retraction movements, may be a linear movement parallel to the depth dimension. Such a linear movement of the rack, in particular a linear movement of the carrier supports for the carriers, may avoid rocking or swinging movements of the carriers in connection with door movements, which may be of advantage if a carrier supports for example vessels filled with liquids. In accordance with linear movements, the carrier supports of the rack may remain substantially at the same horizontal level during the extraction and retraction movements of the rack.

In embodiments, the coupling member may be curved or bent. A curvature or bent shall in particular relate to a pre-defined curvature or bent—contrary to an accidental curvature or bent caused, for example, by inappropriate handling by a user. The curvature or bending may be relative to a reference, in particular to a plane of curvature or plane of bent. The plane of curvature or plane of bent, respectively, may be parallel to the pivoting plane of the coupling member. The pivoting plane in particular refers to the plane in which the coupling member moves during a pivoting movement. For example, if the coupling member is pivotable relative to a pivoting axis, the pivoting movements may lie in a plane that is perpendicular to the pivoting axis. By providing the coupling member with a curved or bent shape, in particular with an arched shape, interferences of the coupling member with actions performed by the user in front of or near the front opening in the opened position of the door may greatly be avoided. In particular curved or bent shapes of the coupling member may, in connection with cooking appliances, prevent users from touching a hot coupling member in the course of removing a carrier from the cavity after commencement or at the end of a cooking process, or when checking a cooking process.

The curvature or bent of the coupling member may be associated with substantially a single radius of curvature or radius of bent, or may be associated with a plurality of radii of curvature or radii of bent varying lengthwise along the coupling member.

In embodiments, the coupling member may be substantially rigid with regard to bending, which has been discussed in more detail already above.

In embodiments, the coupling member comprises at least one region with a single type of curvature or a single type of bent, with a corresponding center or centers of curvature or center(s) of bent lying on a side of the coupling member facing away from a hinge or pivot axis of the door.

The type of curvature or bent may be concave or convex viewed in lengthwise direction of the coupling member. In particular, the coupling member may have an arched shape, for example of concave or convex type, in which the coupling member in the ordinary mounted position is bulged towards the hinge axis of the door.

In embodiments, at least one region with a the single type of curvature or single type of bent is located closer to the pivot mount of the coupling member associated with the door than to the pivot mount of the coupling member associated with the rack. Such a design may for example be advantageous with regard to the avoidance of interferences with user actions near or in front of the front opening in the opened position of the door.

In embodiments, the coupling member comprises at least two regions with different types of curvature or bent. In embodiments, the coupling member may comprise a shape including multiple types of bents or curvatures. For example, the coupling member may comprise in lengthwise direction thereof at least one region with a concave type of curvature or bent, and at least region with a convex type of curvature or bent.

Corresponding centers of curvature or centers of bent may lie in the pivoting plane of the coupling member. The plane of curvature or plane of bent may be parallel to the pivoting plane of the coupling member.

In embodiments, a first center or first centers of curvature or bent of a first region with a first type of curvature or bent may lie on a side of the coupling member facing away from the hinge or pivot axis of the door. A second center or second centers of curvature or bent of a second region with a second type of curvature or bent may lie on a side of the coupling member facing towards the hinge or pivot axis of the door.

In embodiments, the first region may be located closer to the pivot mount of the coupling member associated with the door than to the pivot mount of the coupling member associated with the rack. Further, in embodiments, the second region may be located closer to the pivot mount of the coupling member associated with the rack than to the pivot mount associated with the door. Preferably, the first region is associated with a smaller radius or radii of curvature than the second region. In embodiments, the first region maybe convex and the second region may be concave with regard to the ordinary mounting position and the ordinary operating orientation of the appliance, when viewed in lengthwise direction of the coupling member.

In other words, the first region may be located closer to or be associated with the pivot mount of the coupling member that is associated with or coupled to the door. Further, the second region may be located closer to or be associated with the pivot mount of the coupling member that is associated with or coupled to the rack.

Providing the first and second regions with different types of curvatures or bents in in accordance with the aforementioned embodiments may provide advantages with regard to optimal kinematic coupling between the door and the rack in connection with inserting and extracting carriers, i.e. in connection with extraction and retraction movements, upon closing and opening the door. Further, such embodiments may be advantageous for avoiding interferences between the coupling member and possible user actions during use of the appliance in the door opened state.

In embodiments, the coupling member may be implemented as a wire frame. The coupling member may comprise, at least in between the pivot mounts, a double wire section. The double wire section may comprise for example a pair of substantially parallel wires. Such a coupling member may have advantages with regard to light-weight construction, yet providing sufficient mechanical strength.

In embodiments, at least one of the pivot mounts of the coupling member comprises a loop section, in particular a wire loop, defining a first pivot member. The loop section may positively engage a groove of a second pivot member. The second pivot member may for example be associated with the rack, in particular with the cantilevering element, or the door. A pivot axis of the coupling member in such embodiments may be perpendicular to the plane defined by the area of the loop section. The area of the loop section may by parallel to the pivoting plane of the coupling member.

The second pivot member may for example be implemented as a sphere or disc with an annular groove provided for engagement with the loop section. For example, an outer circumference of the groove may by in contact with an inner circumference of the loop section.

In embodiments, the loop section may comprise a necking or constriction such that the loop section engages around and positively interacts with the groove of the second pivot member and/or the second pivot member. Providing respective neckings or constrictions may be used to couple the loop section pivotally to the second pivot member, for example, without requiring further fixing elements, such as screws, between the loop section and the second pivot member to avoid relative movements between the loop section and the second pivot member in lengthwise direction of the coupling member.

In embodiments, at least one of the pivot mounts of the coupling member comprises a hinge joint. A section of the coupling member may constitute a hinge pin of the hinge joint. For example, the hinge pin may be implemented by an angled section of a wire or rod of the coupling member implemented for example as a wire frame or wire grid.

A corresponding counterpart of the hinge joint, i.e. a complementary hinge joint, may for example be implemented as or comprising at least bent lug or tongue or hinge projection. Such a lug or tongue or hinge projection may for example be provided on an inner wall, in particular an inner sheet, of the door, for example as a free-cut, in particular bent tab or tongue or a hinge projection provided at or on the inner wall of the door to project from the inner wall and to form a mount, in particular an arched mount or socket, for the hinge pin. By this, the coupling member may easily be mounted to the door in a pivotable manner.

In particular, the joint between the coupling member and the rack and/or between the coupling member and the door may be configured to be detachable, in particular in a tool-less manner.

By this, the coupling member may be easily mounted and dismounted from the rack and/or door.

As already indicated, the coupling member may in embodiments be pivoted at the rack based on the loop section engaging a circumferential groove of the second pivot member. The second pivot member may be implemented as a disc, a ball, or sphere. The second pivot member may be associated, for example with the rack, in particular with the cantilevering element. In embodiments, the coupling member may be pivoted at the door based on the hinge pin engaging a corresponding socket formed at or attached to an inner wall, in particular an inner sheet, of the door. The socket may for example be implemented as the arched free-cut tab mentioned above, or as a bearing projection provided at or on the inner wall or sheet of the door.

Corresponding pivoting connections are advantageous with regard to easy and simple attachment and mount of the coupling member. Further, such pivoting connections may be implemented such that they are substantially maintenance-fee, or do not require substantial maintenance effort.

In embodiments, the rack may comprise at least one rack unit, in particular at least one wire rack and/or plate-like rack element, movably associated with the interior of the cavity. In particular, embodiments, the rack may comprise two rack units. Each rack unit may be movably associated with one of the inner lateral side walls of the cavity extending between the back wall and the front opening. The rack unit or rack units may be arranged to be movable parallel to the depth dimension, preferably parallel to the respective side wall. By this, the rack may be moved inwardly and outwardly based on substantially linear retraction and extraction movements parallel to a corresponding lateral side wall. Such movements may be obtained comparatively efficiently by the kinematic coupling provided by the coupling member.

In embodiments, and as mentioned further above, the cavity may comprise two lateral side walls extending between the back wall and the front opening parallel to the depth dimension. In particular, one or more parts of the rack, in particular the rack unit(s) or wire rack(s), may be positioned parallel to at least one of the lateral side walls and comprise at least one shoulder projecting inwardly to the cavity interior. The term "inwardly" shall refer to the ordinary mounting position of the rack. The shoulder may be implemented to rest on an upper side of a component of a runner, such as for example a telescopic runner that is movable in depth dimension of the cavity.

The runner may be part of a guiding unit provided within the cavity and defining the movement path for the rack for extraction and retraction movements. The rack or rack unit may be fixedly or removably coupled to the runner. Also, the runner as such may be fixedly or removably coupled to the cavity. Removability of the rack, rack unit, and/or runner may be of advantage for cleaning purposes in that the rack, rack unit and/or runner can be removed from the cavity for cleaning purposes of the mentioned parts and/or the cavity. Removing the rack and/or runner from the cavity may for example be of advantage in case that the appliance is a baking or cooking oven and the cleaning is carried out by the appliance in a pyrolytic cleaning cycle, in particular if such a pyrolytic cleaning process would be detrimental to the function or the material of the involved parts. If the rack or rack unit is fixedly attached to the runner, removability may nevertheless be obtained by removably attaching the runner to the cavity such that the rack or rack unit may be removed together with the runner.

By means of the shoulders as mentioned above, the rack unit can be moved within the cavity based on the movable mount of the runner, for example in connection with the guiding unit. The runner may be moveably member of the guiding and configured to be moveable along the guiding unit. In the proper mounted state of the guiding unit in the cavity, the runner may be moveable back and forth in depth dimension, thereby enabling extraction and retraction movements of the rack supported by the runner.

The rack, in particular the rack unit, in particular the wire rack or plate-like rack element, may comprise an attachment section extending from the shoulder. The attachment section may be configured to engage a tab, tongue or lug. The tab, tongue or lug may be provided at and defined on the runner a u-shaped groove that opens towards the rack and that is configured for accommodating the attachment section. By this, the rack may easily be mounted in the cavity interior at and movable along a corresponding lateral side wall, for example.

In embodiments, the rack unit, in particular the wire rack or plate-like rack element, may be movably attached to or associated with the inner lateral side wall of the cavity by means of rollers engaging corresponding rails provided at or on the inner lateral side wall of the cavity. The rail may be profiled in its cross section, in particular C-shaped, such that the rollers can engage the rail for guided movements along the rail. The rollers and guide may be considered as a particular implementation of a guiding unit.

In embodiments, a fulcrum defined between the coupling member and the rack is located in un upper third or a lower third or approximately in the middle relative to the, in particular vertical, height of the rack measured perpendicular to the depth dimension and parallel to the area of the front opening, in particular parallel to the lateral side walls of the cavity.

In embodiments, a fulcrum defined between the coupling member and the door may be located, with regard to the door closed position, in a lower third relative to the height of the font opening measured perpendicular to the depth dimension and parallel to the area of the front opening.

Preferably, in particular if the appliance is a baking or cooking oven, a point of connection or attachment between the coupling member and the door may be as close as possible to a hinge or hinge section of the door. For example, the point of connection or attachment may be located within third of the dimension of the door that is close to and adjacent to the hinge.

In general, the hinge may be a vertical or horizontal hinge for opening and closing the door according to a horizontal or vertical pivoting movement.

Providing the point of connection or attachment as close as possible to the hinge or hinge section of the door has the advantage that interferences between the user's hand and the coupling member may be prevented, for example if the appliance is a cooking or baking oven and a user is about to remove a hot carrier from the rack. Further, such configurations have the advantage that the user may grasp a carrier at both sides when removing or putting a carrier from/on the rack, which is of particular advantage in case of heavily loaded carriers. Grasping the carrier from the sides thereof is also advantageous with ergonomics, at least because it is in most cases more convenient for the user to grasp a carrier with both hands.

The point or points of connection or attachment of the coupling member may also be used as a parameter for setting the degree of movement of the rack or rack unit, and accordingly of the carrier, as mediated by the movement of the door, because the movement of the door is coupled to the movement of the rack or rack unit by means of the coupling member. Specifically, the degree of movement is associated with how far the rack, rack unit or carrier projects out of the cavity in the fully opened position of the door. Or, in other words, the degree how far the rack, rack unit or carrier projects out of the cavity in the fully opened position of the door may be defined by the position of the point or points of connection or attachment. In particular, the closer the point or points of connection or attachment are to the hinge or hinge part of the door, the smaller the movement of the rack, rack unit or carrier may be. Conversely, the farther away the point or points of connection or attachment are from the hinge or hinge part of the door, the smaller the movement of the rack, rack unit or carrier may be.

Selecting a point of connection or attachment comparatively close to the hinge or hinge portion of the door has the advantage that the coupling member is more or less hidden for a user, in particular in situations where the user is about to check the cooking process during cooking, for example without the user fully opening the door. Here, burn injuries in connection with the coupling member due to inadvertent movements of a user may be avoided Such arrangements of the fulcrum may be advantageous with regard to obtaining suitable kinematic couplings, for example in embodiments in which the rack remains substantially within or fully within the cavity in the fully opened position of the door.

In embodiments, the appliance further comprises a drive unit kinematically coupled to the door and/or to at least one door hinge. For example, the drive unit may be kinematically coupled to two door hinges of the door. The drive unit may be configured such that, upon activation of the drive unit, the door is automatically transferred, through the action of the drive unit, between the door closed position and the door opened position. Hence, the door may be automatically opened and closed by the action of the drive unit, wherein, by means of the action coupling member, the movement of the door is translated in a corresponding movement of the rack. By this, further assistance may be provided to the user in connection with extraction and retraction movements of carriers relative to the cavity.

In embodiments, the appliance comprises the drive unit and may further comprise a control unit for activating and/or controlling the drive unit. The control unit may be associated with at least one of a touch sensitive, acoustically, or gesture sensitive sensor unit associated or provided with a user interface and/or an application configured for execution by a remote device. The sensor unit may be configured for generating a sensor signal for activating and deactivating the drive unit based on at least one of a touch, acoustic, or gesture input of a user. By this, the user may activate the drive unit, in particular a motor associated with the drive unit, based on corresponding user actions. By activating the drive unit, the door and rack may be automatically moved such that a carrier suspended at or by the rack is moved into or out of the cavity in a retraction and extraction movement, thereby further assisting the user in operating the appliance.

As can be seen, the appliance as suggested in accordance with the invention provides improved user assistance in connection with operating the appliance.

The present invention will be described in further detail with reference to the drawings, in which FIG. 1 illustrates a schematic representation of a side view of a baking oven implemented according to an embodiment of the invention;

Figure 3:
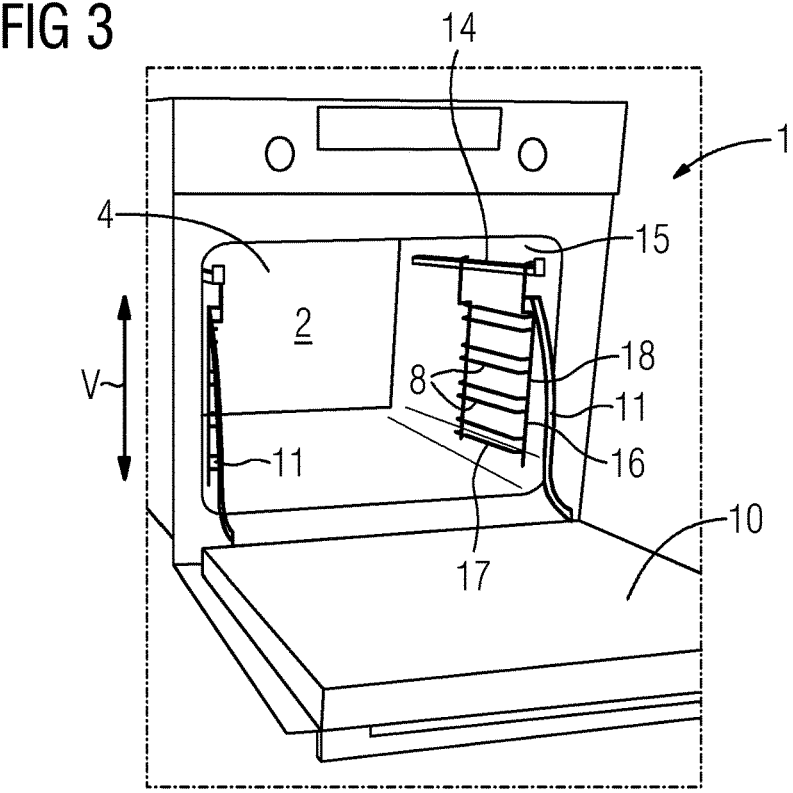
FIG. 3 illustrates a baking oven of a different embodiment from viewed from a frontal perspective.
Figure 4:
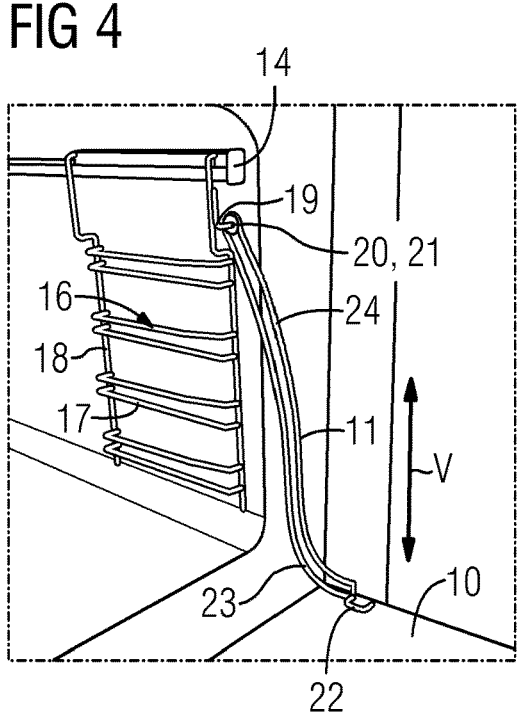
Figure 5:
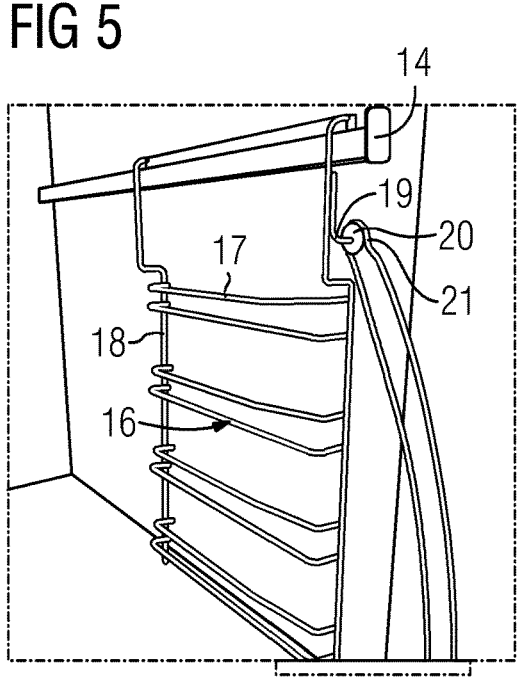
Figure 6:
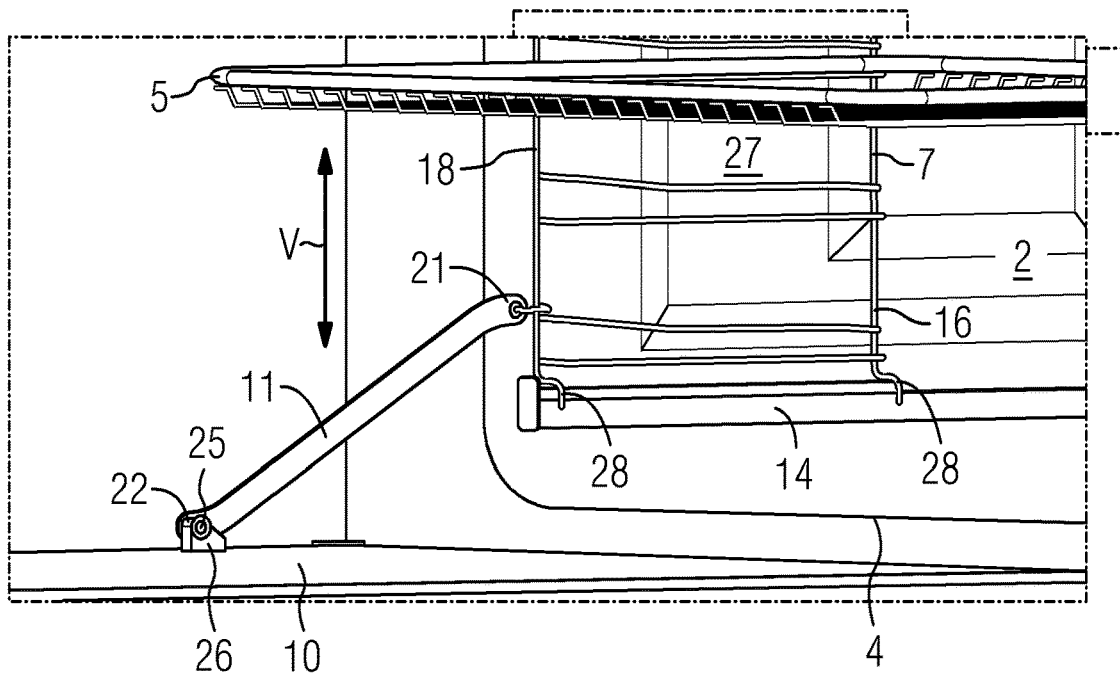
Figure 7:
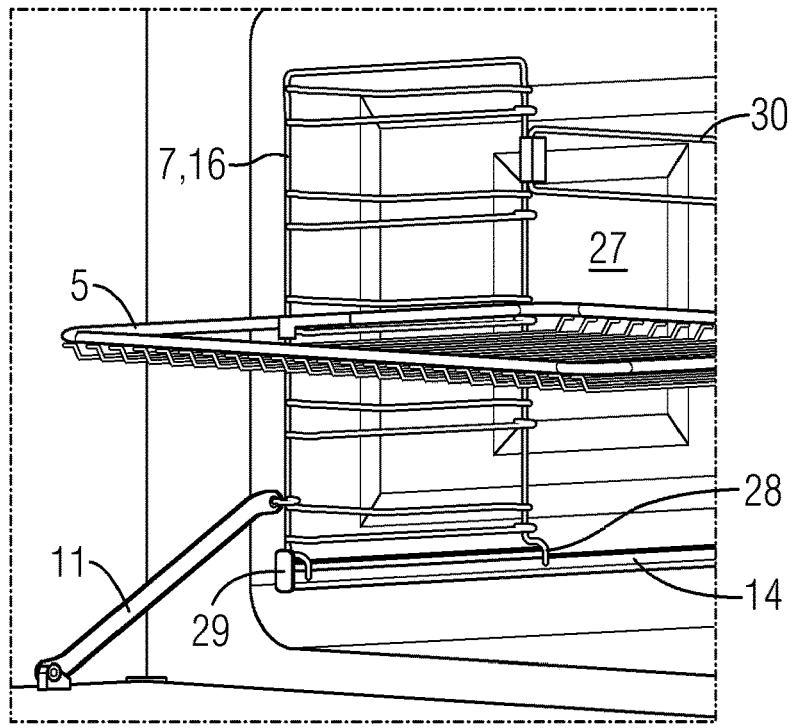
Figure 8:
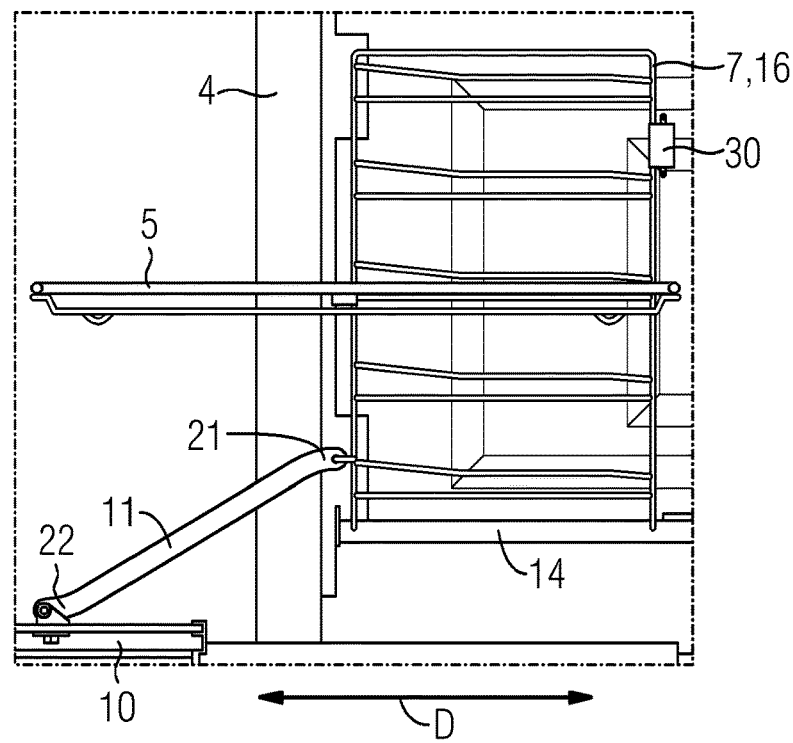
Figure 9:
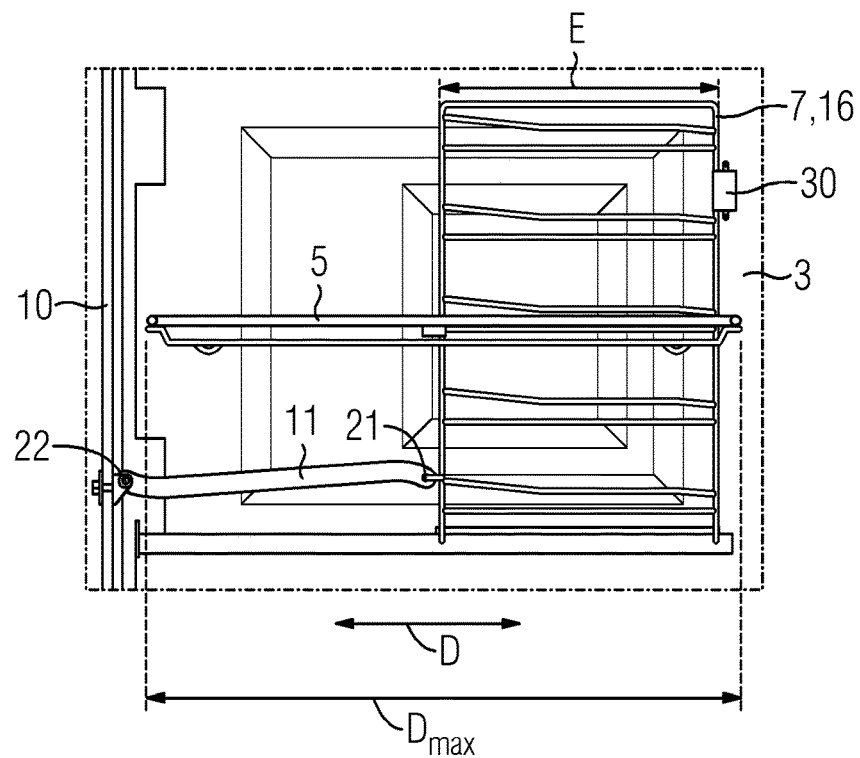
Figure 10:
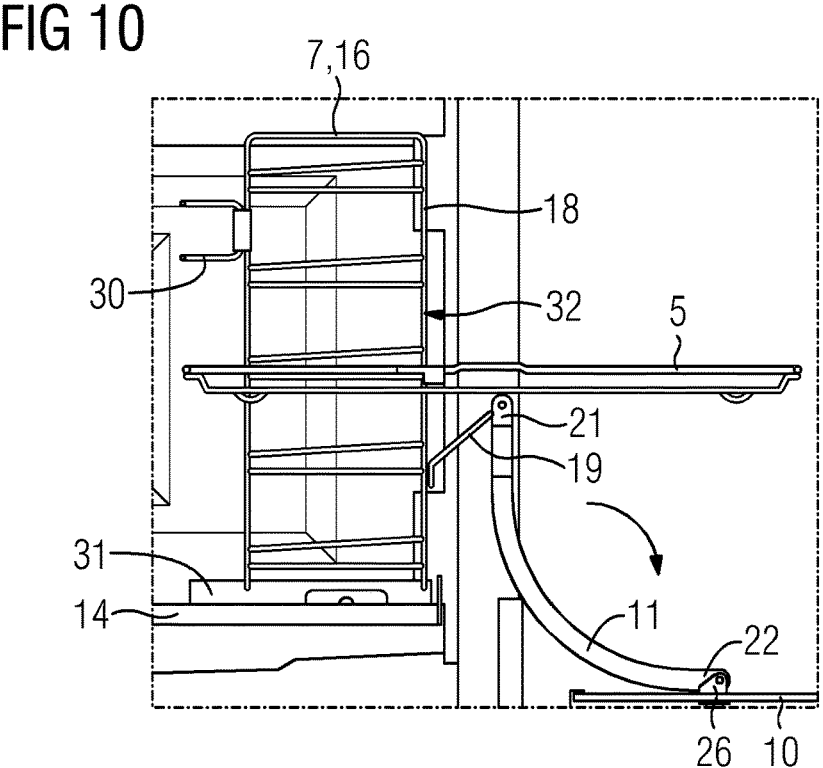
Figure 11:
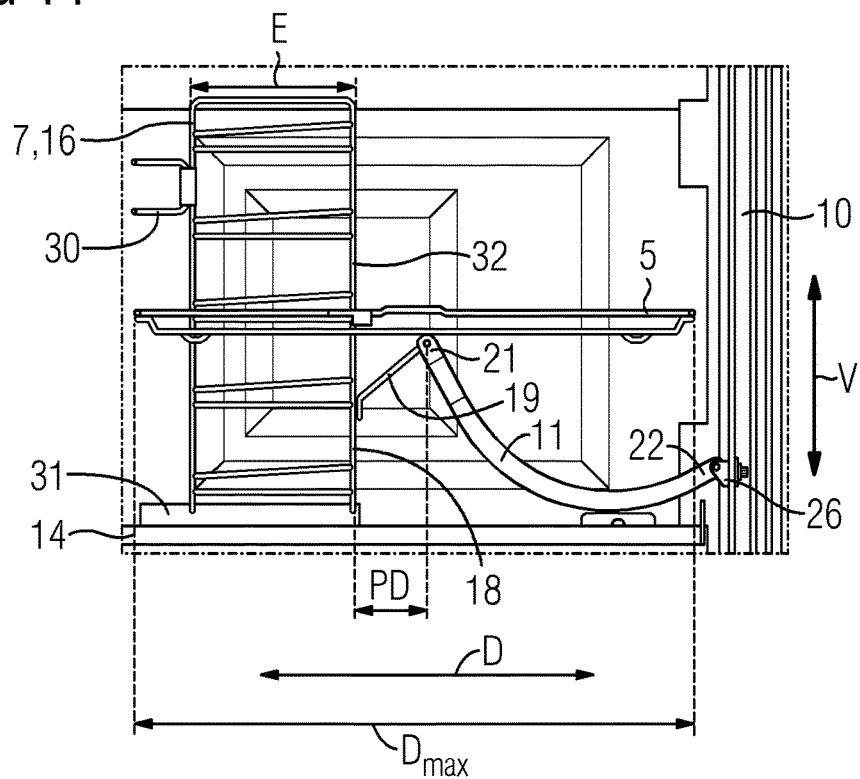
Figure 12:
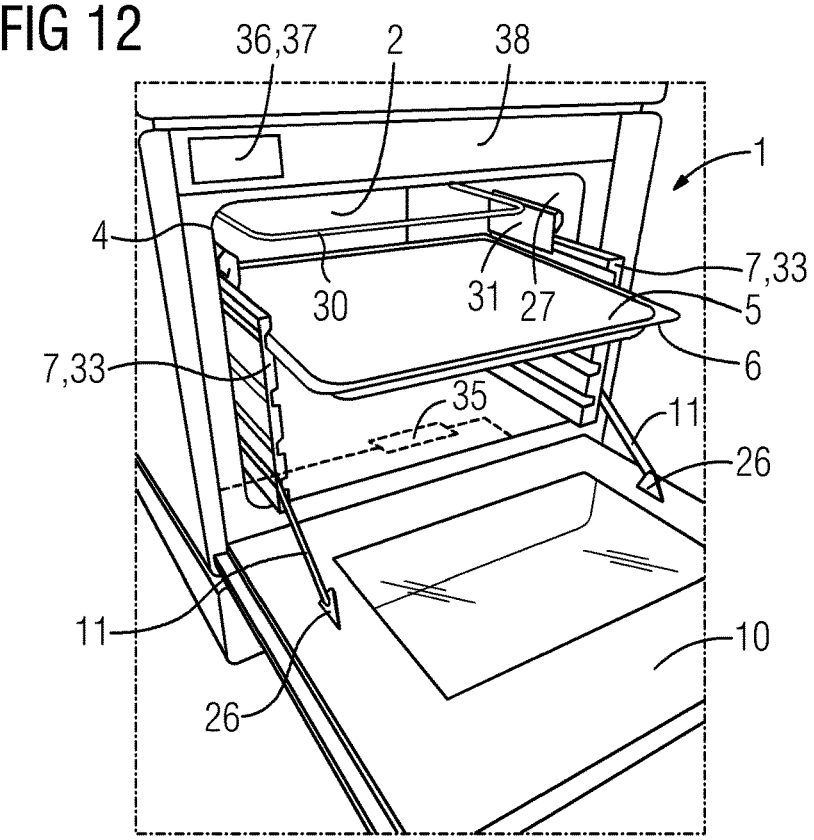

FIG. 4 a first enlarged section of the baking oven of FIG. 3;

FIG. 5 a second enlarged section of the baking oven of FIG. 3;

FIG. 6 illustrates a section of a baking oven of a further embodiment;

FIG. 7 shows a different section of the baking oven associated with FIG. 6;

FIG. 8 illustrates a side view of a section of the baking oven of FIGS. 6 and 7 in the opened position of the door;

FIG. 9 illustrates the side view of FIG. 8 in the closed position of the door;

FIG. 10 illustrates a yet further embodiment of a baking oven with a coupling member in the opened position of the door;

FIG. 11 illustrates the baking oven of FIG. 10 in the closed position of the door;

FIG. 12 illustrates a baking oven of a yet further embodiment; and

Figure 13:
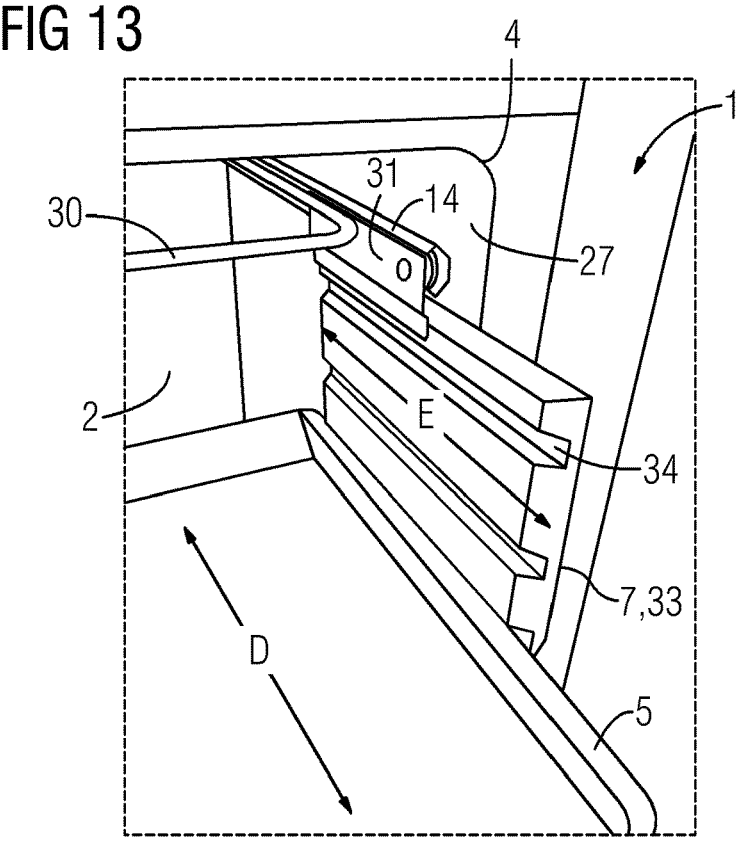

FIG. 13 illustrates an enlarged view of a section of the baking oven of FIG. 12.

Component parts having the same or a similar function may be depicted in different embodiments shown in the figures with the same reference numerals, despite the design and/or shape of such elements may be different. Further, respective component parts may be interchanged with regard to different embodiments at least in so far as a retracting and extracting movements of the rack and/or carriers supported by the rack are concerned.

Figure 1:
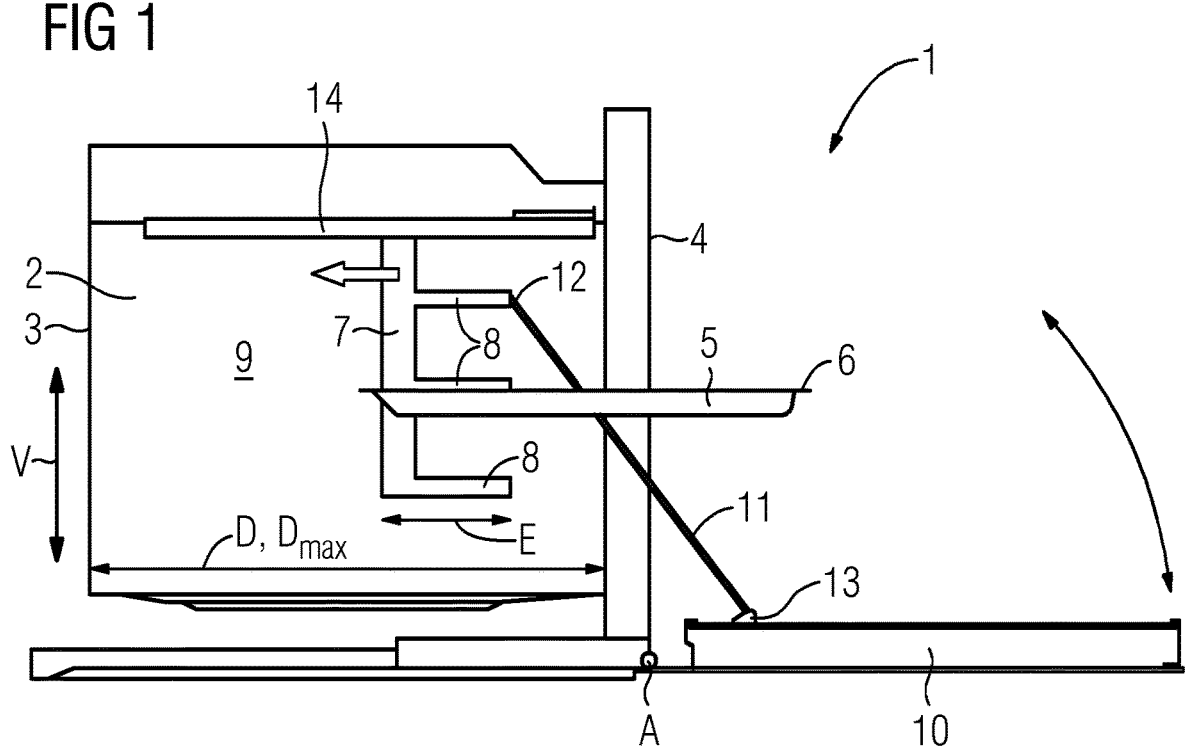

FIG. 1 illustrates a schematic representation of a side view of an exemplary baking oven 1 implemented according to an embodiment of the invention.

The baking oven 1 comprises a cavity 2 comprising a back wall 3 and an opposite front opening 4. The cavity is configured for accommodating therein trays 5, or more general carriers 5, through the front opening 4. The cavity 2 defines in depth dimension D from the front opening 4 to the back wall 3 a maximum depth dimension $D_{max}$ for the accommodation of the trays 5. In FIG. 1, the tray 5 is not fully accommodated within the cavity 2. Specifically, a frontal edge 6 of the tray 5 projects out of the cavity 2, wherein the tray 5 as such projects through the front opening 4.

In the configuration shown in FIG. 1, the user may remove the tray 5 from the baking oven 1, or he may have placed the tray 5 on a tray rack 7, or more generally on a rack 7, for inserting the tray 5 into the cavity 2. For the reason that the frontal end 6 projects out of the cavity 2 and is freely accessible for being grasped by a user in the region of the frontal end 6 of the tray 5, the user may easily handle the tray 5 in connection with removing or inserting the tray 5.

The tray rack 7 of the baking oven 1 comprises several, i.e. in the present embodiment three, tray supports 8, or more general carrier supports, for accommodating and supporting a tray 5 as shown with the middle tray support 8 in FIG. 1. The tray supports 8 are provided such that the tray 5 can be placed at different levels in vertical direction V. The term vertical direction in particular shall relate to the ordinary placement and operating condition of the baking oven 1.

As indicated in FIG. 1 by means of a double lined arrow, the tray rack 7 is movably mounted to the cavity interior 10. As can easily be seen from FIG. 1, the tray rack 7 has a depth extension E, measured parallel to depth dimension D of the cavity 2, that is smaller than the maximum depth dimension $D_{max}$. In the present embodiment, the depth extension E of the tray rack 7 is substantially smaller than the maximum depth dimension $D_{max}$. In particular, the depth extension E is between 10% to 50%, more particularly between 20% to 30% of the maximum depth dimension $D_{max}$.

The baking oven 1 comprises a door 10 that is hinged to a body or frame of the baking oven 1, with a hinge axis A running in horizontal direction. The door 10 is provided for opening and closing the front opening. In particular, the door 10 is for closing the cavity 2 in the closed position of the door 10 as illustrated in FIG. 2, and for enabling access to the cavity interior 9 in the fully opened position of the door 10 as illustrated in FIG. 1.

The baking oven 1 further comprises a coupling member 11 that is implemented and arranged to provide a kinematic coupling between the tray rack 7 and the door 10. The coupling member 11 may be rigid as discussed in more detail further above.

The coupling member 11 comprises pivot mounts spaced in lengthwise direction of the coupling member 11. In the given embodiment, the coupling member 11 comprises a first pivot mount 12 and a second pivot mount 13. The first pivot mount 12 of the coupling member 11 is pivoted at the tray rack 7. The second pivot mount 13 is pivoted at the door 10 by means of suitable pivot connections.

Figure 2:
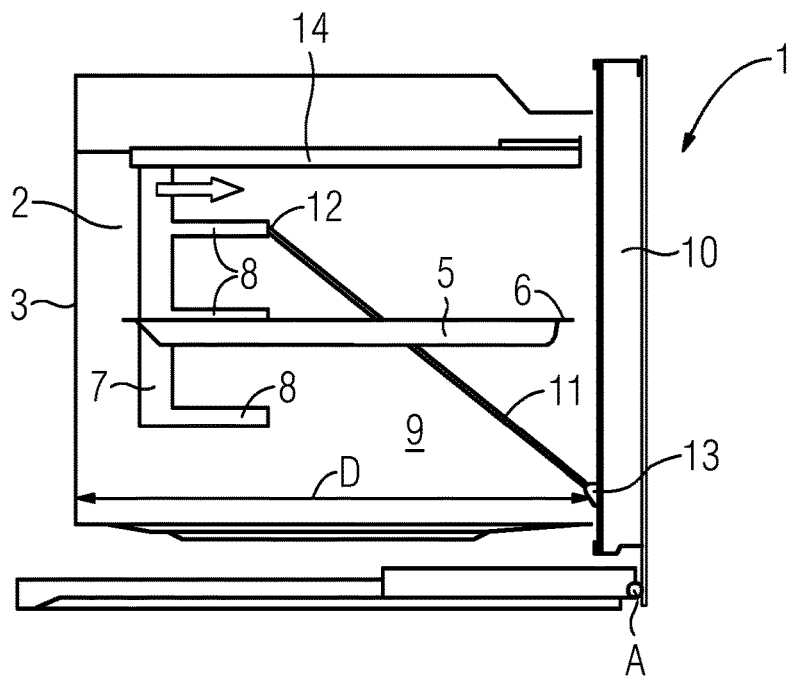
FIG. 2 illustrates the baking oven of FIG. 1 in the closed position of the door.

The coupling member 11, the first and second pivot mounts 12, 13, and the pivot connections pivotally interconnecting the coupling member 11 with the door 10 and tray rack 7, respectively, are configured such that a pivoting movement of the door 10, which is indicated by an arched double arrow in FIG. 1, is translated into a movement of the tray rack 7 in depth dimension D of the cavity (see double lined arrows in FIG. 1 and FIG. 2). The movements in depth dimension may be referred to as extraction movements associated with opening movements of the door 10, and retraction movements associated with closing movements of the door 10.

Specifically, the kinematic coupling mediated by the coupling member 11 and the depth extension E of the tray rack 7 are configured such that the tray rack 7 at most partially projects out of the front opening 4 in the fully opened position of the door 10.

The expression "at most partially" shall mean that the tray rack 7 may at most extend to a certain degree out of the cavity. This term thus covers configurations of the cavity, tray rack 7, and the coupling member 11, in which the tray rack 7 remains within the cavity 2 in the door fully opened position, is positioned at the front opening with a frontal edge being positioned in the region of the opening in the door fully opened position, and in which the tray rack 7 projects to a certain extent out of the cavity 2 in the door fully opened position. Projecting out of the cavity 2 to a certain extent preferably covers configurations of associated component parts of the appliance 1 in which a major part of the tray rack 7, in particular in which at least about 50% to about 90%, preferably about 75% to about 90% of the tray rack 7 when viewed in depth dimension D of the cavity 2, remain within the cavity 2.

In the example of FIG. 1 the expression "at most partially" is fulfilled in so far as the tray rack 7 rests completely within the cavity 2 in the fully opened position of the door 10. To put it differently, resting completely within the cavity 2 represents a subset of the condition referred to as at most partially projecting out of the cavity 2, which has been explained above.

Further, the kinematic coupling mediated by the coupling member 11 and the depth extension E of the tray rack 7 are configured such the tray rack 7 is fully positioned within the cavity 2 in the closed position of the door 10, which is illustrated in FIG. 2. In this FIG. 2, the door 10 is in the closed position, and the tray rack 7 together with the tray 5 are moved in a retraction movement backwards towards the back wall 3 as compared to the situation in FIG. 1.

As can be inferred from a comparison of FIG. 1 and FIG. 2, the coupling member 11 translates the rotary movement of the door 10 into a linear movement of the tray rack 7. In the closed position of the door 10 according to FIG. 2, the tray rack 7 is positioned in the rearmost position, whereas in the opened position of the door 10 according to FIG. 1, the tray rack 7 is positioned in the foremost position regarding the overall back-and-forth movability of the tray rack 7.

The movability of the tray rack 7 is provided based on a rail 14 representing or comprising a runner or slider for the tray rack 7. The tray rack 7 is coupled to the rail 14 to be moveable along the rail 14 in a guided movement. The rail 14 in the present example is provided at an upper section of the cavity 2, in particular in the region of the top wall of the cavity 2. The rail 14 may be mounted or otherwise be provided on an inner side of a lateral side wall of the cavity 2 extending between the back wall 3 and the front opening 4. In embodiments, the rail 14 or other movable attachments provided for the tray rack 7 may alternatively be provided at or on an inner lower side of the top wall of the cavity. Other locations are conceivable, such as for example on or at a lower section of the lateral side wall of the cavity 2 and/or on or at the bottom wall of the cavity 2.

The rail 14 or any other type of runner may be implemented as a separate component part attached to the cavity walls, or the rail 14 may at least in part be integrated with the cavity wall or cavity walls.

As can be seen from FIG. 1, the tray rack 7 remains within the cavity 2 in the fully opened position of the door 10, thereby avoiding any interferences with actions performed by a user in the region of the front opening 4 in the opened position of the door 10. Further, keeping the tray rack 7 within the cavity may be advantageous in particular in connection with baking ovens 1 because the tray racks 7 are usually hot after baking procedures, thereby avoiding the risk of burn injuries.

As may be seen from FIG. 1, even though the tray rack 7 is kept within the cavity 2, the tray 5 is easily accessible at a frontal section thereof to the user for removing the tray 5 from the cavity 2. Further, as may be inferred from FIG. 1, the tray rack 7 is positioned in the frontal position sufficiently close to the inner side of the front opening 4 such that the user can easily insert the tray 5 for coupling the tray 5 to one of the tray supports 8.

FIG. 3 illustrates a baking oven 1 of a different embodiment from a frontal perspective. In this embodiment, each lateral side wall 15 of the cavity 2 of the baking oven 1 comprises a rack unit implemented as a wire rack 16 with several tray supports 8 spaced apart in vertical direction V. The wire racks 16 in this embodiment are part of the tray rack 7 for accommodating and supporting trays 5 within the cavity 2.

As is the case with the embodiment of FIG. 1 and FIG. 2, each of the wire racks 16 is coupled to a coupling member 11 which in turn is coupled to the door 10 such that, in analogy to FIG. 1 and FIG. 2, the pivoting movement of the door 10 is translated into a back-and-forth movement, i.e. into an retraction movement (back) and extraction movement (forth), of the wire racks 16.

Providing a coupling member 11 for each of the wire racks 16 has the advantage that a synchronized movement of the wire racks 16 is obtained even in absence of a tray 5. This of course applies if rack units other than wire racks 16 are used.

Instead of providing two coupling members 11, it is for example also possible to provide only a single coupling member 11, and an interconnecting element, such as a cross-connecting bar or rod or similar, between corresponding rack units. The interconnecting element may be attached to each rack unit for example at the back side, the top side, or the bottom side of the rack units. Instead of using interconnecting elements for mechanically coupling the rack units, the tray rack 7 may be implemented as a one-piece component.

As can be seen from FIG. 3, the wire racks 16 provide tray supports 8 for supporting the trays 5 at their opposed lateral side edges. In the present example, each tray support 8 comprises one or more horizontal wire rods 17 extending between vertical support bars 18, and configured for supporting or engaging a tray edge. If two parallel wire rods 17 are provided, they may be provided as a kind of groove or slot for accommodating and receiving a lateral tray edge.

The upper end sections of the vertical support bars 18 are attached to the rail 14 to be moveable in depth dimension D of the cavity 2 in an extraction and retraction movement. For the attachment, each vertical support bar 18 comprises in an upper end section a shoulder implemented as a bent section. The shoulder is designed to pass each vertical bar 18 around the lower and lateral inner side of the rail 14 facing the cavity interior 9, for movably coupling the wire rack 16, specifically the upper ends of the vertical bars 18, to the rail 14. The wire rack may for example be movably coupled to the rail 14 by means of a runner or slider.

As may be seen from FIG. 3, the coupling members 11 are coupled to the wire racks 16 at the frontal sides thereof, which is also the case in the embodiment in FIGS. 1 and 2. This is illustrated in more detail in FIG. 4 and FIG. 5.

In the embodiment according to FIG. 4 and FIG. 5, each wire rack 16 comprises at the frontal side thereof a cantilevering element 19. In the present embodiment, the cantilevering element 19 is attached to the support bars 18. Each cantilevering element 19 comprises a free end that is arranged averted from the wire rack 16. At the free end, a complementary pivot mount 20 is provided, wherein the complementary pivot mount 20 is configured and arranged for pivotally mounting a first pivot mount 21 of one coupling member 11.

In the present embodiment, the complementary pivot mount 20 is implemented as a disc or has a disc shape. The disc is attached to the free end of the cantilevering element 19.

The disc comprises a circumferential groove, extending in circumferential direction with regard to point of attachment of the free end of the cantilevering element 19. The first pivot mount 21 of the coupling member 11 in the present embodiment is implemented as a wire loop. The groove and the wire loop are mutually adapted such that the wire loop can engage the groove and run along the disc in circumferential direction thereof. The engagement between the groove and the loop represents a type of form-fit coupling. The loop may be slidably coupled to the groove. In alternatives, the loop may be fixedly coupled to the disc, and the disc may be pivotally coupled to the free end of the cantilevering element 19.

In the present embodiment, the coupling member 11 is implemented as a wire frame with two substantially parallel wire sections, in particular wire rods, running in lengthwise direction of the coupling member 11. In principle, the coupling member 11 in this embodiment may be implemented in one piece as a single piece of bent wire. In embodiments, cross-bars may be provided between the wire sections or rods to obtain improved stability against transverse bending.

The engagement of the disc, groove, and loop are such that the coupling member 11 is pivotally coupled to the wire rack 16. In order to fix the first pivot mount 21 that comprises the loop to the disc, the transitional region between the loop and the adjacent sections of the coupling member 11 comprises a notch. By this, the disc may be prevented from moving along the gap between the parallel wire sections of the double wire structure.

At the end of the coupling member 11 averted from the first pivot mount 21, a second pivot mount 22 is provided which is coupled to the door 10. In the present example, the second pivot mount 22 is implemented as a bent section of a wire of the coupling member 11, wherein the bent section provides and defines a pivot pin and a corresponding pivot axis for pivotally coupling the coupling member 11 to the door 10. The bent section may be engaged and embraced by a corresponding complementary pivot mount. The complementary pivot mount may for example be implemented as a kind of sleeve or bent tongue configured for accommodating the bent section as described further above.

The coupling member 11 according to the embodiment in FIG. 4 and FIG. 5 can easily be mounted to the door 10 and wire rack 16. Further, by implementing the coupling member 11 as a wire frame, a light-weight construction may be obtained. Such a light-weight construction has the advantage, in particular in connection with baking ovens 1, that it cools down comparatively fast thereby reducing the risk of burn injuries if a user touches the coupling member 11 some time after opening the door 10 subsequent to a baking process.

As may be inferred from FIG. 4 and FIG. 5, the coupling member 11 has a double-curved structure with curvatures lying in a plane that substantially corresponds to the pivoting plane or plane of movement of the coupling member 11 in connection with opening and closing movements the door 10.

In this embodiment, the double bent structure has the advantage that the coupling member 11 may be designed to follow the shape of the components of the baking oven 1, for example in the opened position of the door 10. For example, the coupling member 11 may be designed such that the coupling member 11 at least in sections is guided substantially along frame or sides of the front opening 4 in the opened position of the door 10. By this, possible interferences with actions performed by a user may be largely avoided in the opened position of the door 10. Further, the double bent structure of the coupling member 11 provides advantages with regard to attaching the coupling member 11 to the tray rack 7 and door 10. Yet further, the double bent structure of the coupling member 11 provides advantages with regard to obtaining suitable and appropriate translation ratios between the pivoting movements of the door 10 and the back-and-forth retraction and extractions movement of tray rack 7.

In the example shown in connection with FIG. 3 to FIG. 5, the double bent structure of the coupling member 11 is provided such that a first bent 23 and a second bent 24 are implemented with opposite curvatures. The first bent 23 is located closer to the second pivot mount 22 and comprises centers of curvature that are located on a side of the coupling member 11 that faces away from the hinge axis A of the door 10. The second bent 24 is located closer to the first pivot mount 21 and comprises centers of curvature that are located on a side of the coupling member 11 facing the hinge axis A. In other words, starting from the first pivot mount 21 in the ordinary mounting position of the coupling member 11 as shown for example in FIG. 4 and FIG. 5, the second bent 24 has a concave shape and the first bent 23 has a convex shape, wherein the terms concave and convex refer to the ordinary mathematical meaning of convex and concave.

The radii of curvature of the first bent 23 are smaller than the radii of curvature of the second bent 24.

FIG. 6 shows a section of a baking oven of a further embodiment, wherein the embodiment differs from that of FIG. 4 and FIG. 5 in particular in the design of the coupling member 11 and the movable attachment of the tray rack 7 within the cavity 2.

Specifically, the coupling member 11 in the example of FIG. 6 is made from a solid or hollow material, for example in the form of a rod or bar. The coupling member 11 pivoted at the door 10 by a hub joint 25 pivotally interconnecting the second pivot mount 22 implemented in the present example as a hole with a corresponding hole or holes of a bearing projection 26 provided on an inner sheet of the door 10 by means of a pin or bolt.

In addition, the coupling member 11 shown in FIG. 6 has bent end sections in the region of the first and second pivot mounts 21 and 22 with comparative moderate curvature. The middle part of the coupling member 11 between the first and second pivot mounts 21 and 22 is substantially straight, it does not include intermediate bent sections. However, bent sections similar to that of FIG. 4 and FIG. 5 may be provided.

The first pivot mount 21 of the coupling member 11 in the given example is implemented as a hole hingedly connected to one of the vertical support bars 18 of the tray rack 7 by means of a ring, e.g. a wire ring, in particular a circular ring.

A further difference to the solution of the example of FIG. 4 and FIG. 5 is that the wire rack 16 in FIG. 6 is movably supported on a rail 14 that is provided, in particular mounted or implemented, at the lower side, in particular at the bottom of the lateral side wall 27.

The wire rack 16, specifically the vertical support bars 18 thereof, comprise shoulders 28 at the bottom side thereof. A horizontal section of the shoulder 28 rests on an upper slide of the rail 14, in particular a runner of the rail 14. A vertical end section located at the bottom end of the shoulder 28 may engage a retaining element for supporting the wire rack 16 in vertical and/or in horizontal direction.

Yet another difference between the example embodiment of FIG. 4 and FIG. 5 on the one hand and the example embodiment of FIG. 6 on the other hand resides in the position of the attachment of the first pivot mount 21 and/or the second pivot mount 22. As may be seen from FIG. 4, the first pivot mount 21 in FIG. 4 is mounted in the upper part, in particular upper third, of the height of the cavity 2 when viewed in vertical direction V. In the embodiment in FIG. 6, the first pivot mount 21 is mounted in the lower part, in particular in the lower third, of the height of the cavity 2 when viewed in vertical direction V.

In all embodiments, the coupling members 11 and the location of the pivoting attachment of the first and second pivot mounts 21 and 22 are configured such that the tray rack 7, in particular the rack units, in particular the wire racks 16, are positioned within the back section of the cavity 2 in the closed position of the door 10 such that the tray 5, if properly supported on the tray rack 7, is fully positioned within the cavity 2. Further, the mentioned component parts are configured such that the tray rack 7, in particular the rack units, such as the wire racks 16, are positioned near the front opening 4 in the opened position of the door 10, such that the tray 5, if properly supported on the tray rack 7, projects to a predefined amount out of the front opening 4. In other words, a predefined section of the tray 5, such as for example 10% to 20% (depending inter alia on the tray size) projects out of the front opening 4 in the opened position of the door 10. By this, the user can easily grasp the tray 5 and thereby is supported in inserting and removing the tray 5 from the tray rack 7.

FIG. 7 shows a different section of the baking oven 1 associated with FIG. 6. As is also visible in FIG. 7, the wire rack 16 is supported by the shoulder 28, i.e. a vertical section of the shoulder 28, on the rail 14.

The rail 14 comprises a frontal bumper 29 or frontal stopper for stopping or restricting the forward movement, i.e. the extraction movement, of the wire rack 16 and/or for preventing the wire rack 16 or a corresponding slide from slipping or dropping off the rail 14. A rearward bumper or rearward stopper may be provided in embodiments, configured for stopping or restricting the backward movement, i.e. the retraction movement, of the wire rack 16 and/or for preventing the wire rack 16 or a corresponding slide from slipping or dropping off the rail 14. Corresponding bumpers or stoppers may be provided with the other embodiments described herein.

As shown in FIG. 7, an interconnector element 30 for connecting the wire rack 16 visible in FIG. 7 with a further wire rack 16 movably supported at the opposing inner lateral side wall 27 of the cavity 2 may be provided. By this, the interconnector element 30 provides a kinematic coupling between the wire racks 16 located at the inner opposing lateral side walls 27 of the cavity 2. By such an interconnector element 30, a single coupling member 11 may be sufficient for obtaining a synchronized movement of both wire racks 16 in connection with the movement of the door 10. However, two coupling members 11 may be provided nevertheless, for example to obtain improved mechanical strength. Further, the interconnector element 30 is provided for stabilizing the position of the wire rack 16 against tilting movements towards and away from the lateral side wall 27, for example. By this, the tray 5 can be securely supported on the tray rack 7. Further, the wire rack 16 can be prevented from gracing or hitting against the lateral side wall 27 during movements within the cavity 2 mediated by the kinematic coupling with the door 10.

FIG. 8 illustrates a side view of a section of the baking oven 1 of FIGS. 6 and 7 in the opened position of the door 10, and FIG. 9 shows the side view of FIG. 8 in the closed position of the door 10. As can be seen from a combined view of those figures, the coupling member 11 and the location of the mounting locations for the first and second pivot mounts 21 and 22 are such that the wire rack 16 remains positioned within the cavity 2 in the opened position of the door 10, and that the tray rack 7 is positioned close to the front opening 4 in the opened position of the door 10. In particular, in the closed position of the door 10 the tray 5 is accommodated within the cavity 2 and positioned such that baking processes can be carried out. In the opened position of the door 10, the tray rack 7 is positioned such that the tray 5 may be easily removed from and placed on the tray rack 7.

In the given example, the tray rack 7 and coupling member 11 are configured such that a properly positioned tray 5 projects by about or at least ⅓ of the length in depth dimension D out of the front opening 4.

As may be seen from FIG. 9, the depth extension E of the tray rack 7 is about ½ of the maximum depth dimension $D_{max}$ of the cavity 2, wherein the depth extension E of the tray rack 7 in the given example is about ½ of the extension of the tray 5 measured parallel to the depth dimension D.

By selecting a suitable depth extension E, the tray rack 7 may be kept within the cavity 2, thereby avoiding any interferences with actions carried out by a user outside of the cavity 2 in connection with operating the baking oven 1. Further, removing and placing the tray 5 may be facilitated, because a predetermined amount of the tray 5 freely projects from the front opening 4 and can thus be grasped by the user.

FIG. 10 illustrates a further embodiment of a baking oven with a coupling member 11, wherein the side view of FIG. 10 corresponds to the opened position of the door 10. FIG. 11 shows the baking oven of FIG. 10 in the closed position of the door 10.

In this embodiment, the tray rack 7, in particular the depth extension E of the wire racks 16 is shorter as compared to the embodiment in FIG. 9. In the embodiment of FIGS. 10 and 11, the depth extension E of the wire racks 16 is about 20% to 30% of the maximum depth dimension $D_{max}$ substantially corresponding to the extension of the tray 5 in depth dimension D placed within the cavity 2.

The tray rack 7 of the embodiment of FIG. 10 and FIG. 11 comprises two wire racks 16 placed at opposed inner lateral side walls 27 of the cavity 2. The wire racks 16 are mutually coupled with an interconnector element 30 as described further above in connection with a different embodiment.

The wire racks 16 of the present embodiment are placed on and supported by a slider element 31 that is movably coupled to the rail 14. The slider element 31 is arranged movable back-and-forth in depth dimension D. The slider element 31 may be moveably coupled to the rail 14 by means of wheels or rolls or similar rolling elements. Alternatively, the slider element 31 may be moveably coupled to the rail 14 based on a sliding bearing.

The rail 14 may be implemented as a separate component part to be mounted within the cavity 2. In embodiments, the rail 14 may, at least partially, be integrally formed with one of the inner walls of the cavity 2.

In the example embodiments, the tray 5 may be implemented as an accessory support. The tray 5 may for example made from wire, e.g. as a wire grating or similar. Further, the tray 5 may be made from sheet material, for example in the form of a planar bowl-shaped flat shell.

The type of tray 5 and the material of the tray 5 may be selected according to the type of appliance. Further, the type and design of the tray rack 7, the type and design of the coupling member 11, and the materials thereof may be selected according to the type of appliance. For example in case of a baking oven 1 as described in connection with the embodiments shown in the figures, the mentioned components may at least in part be made from at least one of metal, glass, temperature resistant plastic or other suitable materials. In case of a refrigerator or dishwasher, the components may at least in part be made from plastic, glass, metal, or other suitable materials.

In the embodiment shown in FIG. 10 and FIG. 11, the coupling member 11 is pivotally attached at the door 10 by means of a bearing projection 26 to which the second pivot mount 22, for example by means of a through-hole, is attached by a bolt or pin acting as the pivoting axis. The first pivot mount 21 is attached to the tray rack 7, by means of a cantilevering element 19. The connection between the coupling member 11 and the cantilevering element 19 may be established in that a through hole provided in the first pivot mount 21 is pivotally coupled to a pin or bolt section of the cantilevering element 19. The pin or bolt section, which may be implemented as a pin or bolt projection or as an intermediate section of the cantilevering element 19, may be provided at a frontal side of the cantilevering element 19 spaced apart a given distance from the frontal side 32 of the tray rack 7, specifically the wire rack 16.

The cantilevering element 19 as such is, in the given example, attached to a frontal side 32 of the tray rack 7, specifically to a frontal side 32 of the wire rack 16, more specifically to a frontal side 32 of the frontal support bar 18 of the wire rack 16. The attachment may be one of screwed, welded, or integral design.

The cantilevering element 19 projects from the frontal side 32 such that the pivot axis for the first pivot mount 21 is positioned a predefined distance PD from the support bar 18, specifically a predefined distance from the point of attachment at the wire rack 16.

In the given example, the cantilevering element 19 has a substantially triangular shape, with two legs extending from the pin or bolt section that is pivotally coupled to the coupling member 11 towards the wire rack 16. In the given example, an upper leg is arranged substantially vertically, whereas a lower leg is arranged inclined downwards. Based on the triangular shape, the mechanical strength of the cantilevering element 19 may be improved and specifically adapted to respective needs for translating the movements and forces occurring in connection with the movements of the door 10 into suitable forces and movements for moving the tray rack 7 back and forth in retraction and extraction movements for trays 5. The legs that define the cantilevering element 19 are positioned within a plane that is parallel to the plane of movement of the coupling member 11, and preferably perpendicular to the plane associated with the area of the front opening 4.

The cantilevering element 19 in the given example has an arched shape, which is convex in the present case when viewed from the first pivot mount 21 in the properly mounted position. The curvature of the arched shape is defined in a plane of curvature that is parallel to the plane of movement of the coupling member 11, and preferably perpendicular to the plane associated with the area of the front opening 4. The radius or the radii of curvature of the arched shape lie on a side of the coupling member 11 that is averted from the hinge axis A of the door 10, in particular averted from the bottom wall of the cavity 2, in the ordinary operating position of the door 10.

As can be seen from FIG. 11, the coupling member 11, specifically the point of pivotal coupling of the first pivot mount 21 to the tray rack 7, specifically to the cantilevering element 19, is located approximately in the middle or slightly below the middle of the tray rack 7, specifically of the frontal support bar 18, in vertical direction V.

The length of the coupling member 11, the position of the first and second pivot mounts 21, 22, corresponding pivot attachment points at the tray rack 7 and the door 10 and complementary pivot mounts, and the depth extension E of the tray rack 7, specifically the wire rack 16, are arranged such that a tray 5 properly positioned on the tray rack 7 extends, in the opened position of the door 10 out of the front opening 4, for example by 20% to 30%, or even 30% to 40%, or even 50% of the length of the tray 5 measured in depth dimension D. In this connection, it is noted that the mentioned proportions of a tray 5 with regard to the amount projecting out of the front opening 4 in the fully opened position of the door 10 shall apply generally, in particular for any other embodiment described herein.

By projecting out of the front opening 4 as described, the user can easily handle the tray 5 in connection with placing the tray 5 on the tray rack 7 and in connection with removing the tray 5 from the tray rack 7. Further, the arched shape of the coupling member 11 in the given example provides advantages with regard to possible interferences with user actions carried out in the region of the front opening 4.

FIG. 12 and FIG. 13 illustrate a baking oven 1 of a further embodiment, wherein FIG. 13 illustrates an enlarged view of a section of the baking oven 1 shown in FIG. 12.

In the embodiment of FIG. 12 and FIG. 13, the tray rack 7 comprises two plate-like component parts, specifically two plate-like rack elements 33. Each of the rack elements 33 is arranged and positioned parallel to an inner lateral side wall 27 of the cavity 2.

The rack element 33 comprises a number of parallel grooves 34 oriented, in the properly mounted position, parallel to the depth dimension D of the cavity 2. The grooves 34 are arranged and configured such that they can accommodate opposed lateral side edges of the tray 5. Further, the grooves 34 are formed such that trays 5 can be placed at different vertical levels within the cavity 2.

The rack element 33 is moveably attached to a rail 14 that is in the given example mounted at an upper site of a corresponding lateral side wall 27 of the cavity 2. The rack element 33 is moveably coupled to the rail 14 by means of a slider element 31. The slider element 31 is fixedly attached to an upper side or edge of the rack element 33. Specifically, the slider element 31 is attached to a rear section of the rack element 33. The slider element 31 is moveably coupled to the rail 14 for example by means of rolls or wheels engaged by the rail 14 which has a C-shaped cross section for encompassing the rolls or wheels and for guiding the rolls or wheels in lengthwise direction of the rail 14.

The rack elements 33 are kinematically coupled by an interconnector element 30, in particular for mechanically stabilising the arrangement and movement of the rack elements 33. In addition, by the interconnector element 30, the kinematic coupling between the door 10 and the tray rack 7 may be established by a single coupling member 11 provided, for example, on one of the lateral sides of the font opening 4. However, in the example shown in FIG. 12, two coupling members 11 are provided, wherein each coupling member 11 is coupled at one end to the door 10 by a bearing projection 26, and on the other end to the tray rack 7, specifically to the rack elements 33, by means of a suitable pivoting coupling.

In the given example, the coupling members 11 are implemented as straight coupling members, such as bars or rods, when considered in lengthwise direction thereof. The pivotal attachment of the coupling members 11 to the rack elements 33 may be provided on the side of a corresponding rack element 33 that faces the adjacent lateral side wall 27. In particular, the pivotal attachment of the coupling member 11 to a corresponding rack element 33 may be provided at or within the interspace between the rack element 33 and the adjacent lateral side wall 27. If required, a cut-out may be provided at the side of the rack element 33 facing the adjacent lateral side wall 27 such that sufficient space for providing pivoting elements and corresponding pivoting movements of the coupling member 11 and the rack element 33 is available. Further, providing a cut-out may be advantageous with regard to space saving arrangements, in which the rack element 33 is positioned as close as possible to the lateral side wall 27. In particular space saving arrangements may be provided with regard to installation space perpendicular to the depth dimension D of the cavity 2.

In the example given in FIG. 12 and FIG. 13, the rack element 33 has a depth extension E that amounts to about 30% to 50% of the maximum depth dimension of the cavity 2.

Further, in the given embodiment, the rack element 33 and the coupling member 11 are arranged and configured such that the rack elements 33 project out of the cavity 2, specifically out of the front opening 4, in the opened position of the door 10. In particular, corresponding components may be arranged such that a section of 10% to 20% or 10% to 30% of the rack element 33 projects out of the front opening 4 in the opened position of the door 10.

Albeit the rack element 33 projects out of the front opening 4 in the opened position of the door 10, the tray 5 can still be placed on the tray rack 7, the rack elements 33, and the grooves 34, such that a frontal edge 6 of the tray 5 is freely exposed at the front side in the opened position of the door 10. By this, a user can grasp the tray 5 at least in the region of the frontal edge for removing the tray 5 from or for placing the tray 5 on the tray rack 7.

In addition, the rack elements 33 projecting from the front opening 4 in the opened position of the door 10 may, in the given example, be advantageous with regard to supporting the user in engaging the lateral side edges of the tray 5 with the grooves 34. In particular, the frontal sides of the grooves 34 are readily visible and accessible to a user in the opened position of the door 10. Also, because the rack elements 33 project from the front opening 4 in the opened position of the door 10, the coupling member 11 may be implemented comparatively short with regard to the lengthwise extension thereof. Further, the coupling member 11 may be pivoted at a lower section of the rack elements 33 thereby at least reducing possible interferences with user actions carried out by the user in the opened position of the door 10.

The embodiment of FIGS. 12 and 13 further includes an optional drive unit 35 which is kinematically coupled to the door 10, e.g. by a transmission, for example to the hinges of the door 10.

The drive unit 35 may be an electric drive unit, a linear drive unit, a pneumatic drive unit or other type of drive unit, configured for automatically transferring the door 10 through the action of the drive unit 35 and based on the kinematic coupling with the door 10 between the opened position of the door 10 and the closed position of the door 10.

For the reason that the door 10 is kinematically coupled to the drive unit 35, and because the tray rack 7 is kinematically coupled to the door 10, activating the drive unit 35 results in an automatic extraction of the tray rack 7 out of the cavity 2 or in an automatic retraction of the tray rack 7 into the cavity 2.

If a tray 5 is positioned on the tray rack 7, activating the drive unit 35 results in an automatic extraction of the tray 5 at least partially out of the cavity 2 or in an automatic retraction of the tray 5 into the cavity 2. By this, use and operating of the baking oven 1 in connection with extracting and retracting trays 5 may be simplified for the user.

The baking oven 1 of the example in FIG. 12 and FIG. 13 further comprises a control unit 36 for activating and/or controlling the drive unit 35. The control unit 36 may comprise control electronics accommodated in an inner section or segment of the casing of the baking oven 1. The control unit 36 may further comprise or be associated with a touch sensitive, an acoustically sensitive, or a gesture sensitive sensor unit of a user interface 37. The user interface 37 may for example be implemented as or comprise a touch sensitive screen, or may comprise particular control elements enabling a user to control the drive unit 35, for example by touch signals, acoustic signals, or gestures. In the given example, the user interface 37 is attached or mounted in or at a control panel 38 positioned at an upper side of the casing or shell of the baking oven 1. The user interface may in embodiments or in alternatives be associated with an application configured for execution on an external, i.e. a remote device, such as a handheld device, e.g. a mobile device such as a mobile phone. The external device may be coupled for example wirelessly and/or wire-bound to a controller installed with the baking oven 1 such that control signals for controlling the operation of the drive unit 35 may be transmitted between the external device and the controller. The external device, specifically the application may, in response to user instructions, in particular user interactions such as touch events on corresponding touch areas, acoustic signals recorded via a microphone, gestures or similar, generate control signals configured for causing the drive unit 35 to open or close the door 10. The control signals may be transmitted to the controller and instruct the controller accordingly. By this, the control unit 36 may support the user in operating the baking oven 1.

It shall be noted that, even though the drive unit 35, corresponding control units 36, user interfaces 37, control panels 38 and related components and aspects have been described in connection with the embodiment of FIG. 12 and FIG. 13, such components and aspects may be provided with any other embodiment described herein, wherein respective components and aspects are not restricted to baking ovens, and may be applied to any appliance in accordance with the invention.

Further, albeit the exemplary embodiments described in connection with the figures refer to a baking oven 1, the disclosed exemplary solutions in connection with the tray racks 7, the coupling members 11, and other aspects apply mutatis mutandis to other appliances.

LIST OF REFERENCE NUMERALS 1 baking oven
2 cavity
3 back wall
4 front opening
5 tray
6 frontal edge of the tray
7 tray rack
8 tray support
9 cavity interior
10 door
11 coupling member
12 first pivot mount
13 second pivot mount
14 rail
15 side wall
16 wire rack
17 wire rod
18 support bar
19 cantilevering element
20 complementary pivot mount
21 first pivot mount
22 second pivot mount
23 first bent
24 second bent
25 hub joint
26 bearing projection
27 lateral side wall
28 shoulder 29 frontal bumper
30 interconnector element
31 slider element
32 frontal side
33 rack element
34 groove
35 drive unit
36 control unit
37 user interface
38 control panel
A hinge axis
D depth dimension
$D_{max}$ maximum depth dimension
E depth extension
PD predefined distance
V vertical direction

The invention claimed is:

1. A cooking appliance, comprising:
   a) a cavity comprising a back wall and an opposite front opening, and configured for accommodating one or more carriers through the front opening, the cavity having an interior defining in a depth direction from the front opening to the back wall a maximum depth dimension for accommodation of said one or more carriers;
   b) a rack comprising at least one carrier support for supporting, within the cavity, said at least one carrier, the rack being movably associated with the cavity interior and having a depth extension, measured parallel to the depth direction of the cavity, that is 10% to 50% of the maximum depth dimension;
   c) a door configured to open and close the front opening and hinged to open to outside of the appliance, and
   d) at least one coupling member providing a kinematic coupling between the rack and the door, wherein the coupling member comprises at least two pivot mounts being pivoted at the rack and the door, respectively, such that a pivoting opening and closing movement of the door is translated into an extraction and retraction movement of the rack along the depth direction by action of the coupling member via the pivot mounts, wherein
   e) the kinematic coupling and depth extension of the rack are configured such that:
   the rack is fully positioned within the cavity in a door closed position, and
   the rack at most partially projects out of the front opening in a door fully opened position.

2. The appliance according to claim 1, wherein the coupling member is coupled to a frontal section of the rack, wherein the rack comprises at the frontal section at least one cantilevering element having a free end with a complementary pivot mount for pivotally mounting one of the pivot mounts, wherein the cantilevering element projects at the frontal side of the rack parallel to or perpendicular to the depth direction of the cavity, and wherein the cantilevering element has a triangular design with two legs extending between a frontal side of a bar of the rack and the complementary pivot mount, and/or the cantilevering element fixing the complementary pivot mount at a predefined distance from a frontal attachment site of the cantilevering element.

3. The appliance according to claim 1, further comprising at least one damping element configured to damp movements of at least one of the rack, the door, and at least one of the one or more carriers, said movements being mediated by the coupling member between the rack, the door and/or the least one of the one or more carriers, wherein the damping element is configured to directly interact with at least one of: the door (10), a door hinge, the coupling member, the rack, and the at least one of the one or more carriers, wherein the damping element is associated with one of the coupling members, at least one of the pivot mounts, the rack, and/or the door, the door hinge of the door.

4. The appliance according to claim 1, wherein the movement of the rack along the depth direction is a linear movement.

5. The appliance according to claim 1, wherein the coupling member is curved or bent with reference to a plane of curvature or plane of bent, the plane of curvature or plane of bent, respectively, being parallel to a pivoting plane of the coupling member, wherein, the coupling member is substantially rigid with regard to bending.

6. The appliance according to claim 5, wherein the coupling member comprises at least one region with a single type of curvature or a single type of bent, with a corresponding center or centers of curvature or center(s) of bent lying on a side of the coupling member facing away from a hinge axis of the door.

7. The appliance according to claim 6, the at least one region with a single type of curvature or single type of bent being located closer to the pivot mount of the coupling member associated with the door than to the pivot mount of the coupling member associated with the rack.

8. The appliance according to claim 5, wherein the coupling member comprises at least two regions with different types of curvature or bent, with corresponding centers of curvature or centers of bent lying in the pivoting plane of the coupling member, a first center or first centers of curvature or bent of a first region with a first type of curvature or bent lying on a side of the coupling member facing away from a hinge axis of the door, and a second center or second centers of curvature or bent of a second region of a second type of curvature or bent lying on a side of the coupling member facing towards the hinge axis of the door.

9. The appliance according to claim 8, the first region being located closer to the pivot mount of the coupling member associated with the door than to the pivot mount of the coupling member associated with the rack, and the second region being located closer to the pivot mount of the coupling member associated with the rack than to the pivot mount associated with the door), wherein the first region is associated with a smaller radius or radii of curvature or bent than the second region.

10. The appliance according to claim 1, wherein the coupling member is implemented as a wire frame comprising at least in between the pivot mounts a double wire section of substantially parallel wires.

11. The appliance according to claim 1, wherein at least one of the pivot mounts of the coupling member comprises a loop section defining a first pivot member positively engaging a groove of a second pivot member with an associated pivot axis perpendicular to a plane defined by an area of the loop section.

12. The appliance of claim 11, wherein the coupling member is pivoted at the rack based on the loop section engaging a circumferential groove of the second pivot member implemented as one of a disc, ball, and sphere and associated with the rack, and/or wherein the coupling member is pivoted at the door based on a hinge pin engaging a corresponding socket formed at or attached to an inner wall of the door.

13. The appliance according to claim 1, wherein at least one of the pivot mounts of the coupling member comprises a hinge joint with a section of the coupling member constituting a hinge pin of the hinge joint.

14. The appliance according to claim 1, wherein the rack comprises at least one rack unit movably associated with the interior of the cavity, each said rack unit being movably associated with one of two opposing inner lateral side walls of the cavity and movable parallel to the depth direction.

15. The appliance according to claim 1, wherein the cavity comprises two lateral side walls extending between the back wall and the front opening parallel to the depth direction, wherein one or more parts of the rack are positioned parallel to at least one of the lateral side walls and comprise at least one shoulder projecting inwardly towards the cavity interior, the at least one shoulder resting on an upper side of a component of a telescopic runner that is movable along the depth direction of the cavity, wherein the rack comprises an attachment section extending from the at least one shoulder and configured to engage a tab, wherein the runner defines a u-shaped groove that opens towards the rack and that is configured for accommodating the attachment section.

16. The appliance according to claim 1, wherein a fulcrum defined between the coupling member and the rack is located in un upper third or a lower third or approximately in a middle relative to the height of the rack measured perpendicular to the depth direction and parallel to an area of the front opening, and/or wherein a fulcrum defined between the coupling member and the door is located, with regard to the door in the door closed position, in a lower third relative to a height of the front opening measured perpendicular to the depth direction and parallel to the area of the front opening.

17. The appliance according to claim 1, comprising a drive unit kinematically coupled to the door and/or to at least one door hinge, and configured such that, upon activation of the drive unit, the door is automatically transferred, through action of the drive unit, between the door closed position and the door fully opened position.

18. The appliance according to claim 17, comprising a control unit configured to activate and/or control the drive unit, wherein the control unit is associated with at least one of a touch sensitive, acoustically sensitive, or gesture sensitive sensor unit of a user interface and/or an application configured for execution by a remote device, the sensor unit configured for generating a sensor signal for activating and deactivating the drive unit based on at least one of a touch, acoustic, and gesture input of a user.

19. A cooking appliance comprising:
a cooking cavity having a back wall, opposing lateral side walls, and a front opening opposite the back wall, the cavity defining a maximum depth dimension along a depth direction extending between the back wall and the front opening;
opposing rails disposed adjacent to the opposing lateral side walls and extending along the depth direction;
a tray rack mounted within the cooking cavity via at least one of said opposing rails and being translatable therealong in the depth direction between a fully inserted position located adjacent to the back wall of the cavity and a fully withdrawn position located more remote from the back wall of the cavity, said tray rack defining a first plurality of vertically spaced grooves that extend along the depth direction adjacent to a first of the opposing lateral side walls of the cavity, each of the first plurality of vertically spaced grooves being configured to accommodate and support a first lateral edge of a tray therein adjacent to said first opposing lateral side wall;
a hinged door configured to reversibly open and close the front opening of the cooking cavity by pivoting about a pivot axis that extends perpendicular to the depth direction and is located below a lower end of the front opening; and
a first coupling member pivotally interconnecting said tray rack with said door and being configured such that:
when said door is pivoted into a closed position closing the front opening, said tray rack is thereby kinematically translated along said at least one of the opposing rails into the fully inserted position, and
when said door is pivoted into a fully opened position such that the door is oriented substantially horizontally adjacent to the lower end of the front opening, said tray rack is thereby kinematically translated along said at least one of the opposing rails into the fully withdrawn position;
wherein a first fulcrum defined between the coupling member and the tray rack is located in an upper third or a lower third of the tray rack in relation to its height measured perpendicular to the depth direction and parallel to an area of the front opening, and a second fulcrum defined between the coupling member and the door is located, with regard to the door in the door closed position, in a lower third of the door in relation to its height measured perpendicular to the depth direction and parallel to the area of the front opening;
wherein said tray rack has a depthwise extension that is 10% to 50% of the maximum depth dimension; and
wherein the depthwise extension of the tray rack and a configuration of the first coupling member are such that in said fully withdrawn position of said tray rack:
the tray rack does not emerge out of the cooking cavity through said front opening, and
a tray having a depth of approximately the maximum depth dimension of the cooking cavity, when seated within one of said first plurality of vertically spaced grooves in the tray rack, will emerge out of the cooking cavity through said front opening such that a front edge of such tray will be graspable by a user at a position located outside the cooking cavity.

20. The cooking appliance of claim 19, said tray rack comprising a first lateral rack portion and a second lateral rack portion opposing one another and being located respectively adjacent to the opposing lateral side walls of the cooking cavity; the first lateral rack portion being translationally supported by a first one of said opposing rails and defining said first plurality of vertically spaced grooves; the second lateral rack portion being translationally supported by a second one of said opposing rails and defining a second plurality of vertically spaced grooves that extend along the depth direction adjacent to a second of the opposing lateral side walls of the cavity; each of the second plurality of vertically spaced grooves opposing a corresponding one of the first plurality of vertically spaced grooves and being configured to accommodate and support a second lateral edge of a tray therein, such that such a tray can be supported at a selected vertical level within the oven cavity between opposing ones of the first and second pluralities of grooves; said first coupling member pivotally interconnecting the first lateral rack portion of the tray rack with the door; and a second coupling member pivotally interconnecting the second lateral rack portion of the tray rack with the door, said second coupling member being configured such that:
when said door is pivoted into said closed position, both the first and second lateral rack portions are thereby cooperatively kinematically translated in tandem along the respective first and second opposing rails into the fully inserted position of the tray rack, and when said door is pivoted into said fully opened position, both the first and second lateral rack portions are thereby cooperatively kinematically translated in tandem along the respective first and second opposing rails into the fully withdrawn position of the tray rack.

\* \* \* \* \*